(12) United States Patent
Potentas

(10) Patent No.: US 12,261,347 B2
(45) Date of Patent: Mar. 25, 2025

(54) TECHNIQUE FOR CONTROLLING AN AIRBORNE ANTENNA SYSTEM

(71) Applicant: Telefonaktiebolaget LM Ericsson (publ), Stockholm (SE)

(72) Inventor: Wojciech Potentas, Lodz (PL)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 377 days.

(21) Appl. No.: 17/778,251

(22) PCT Filed: Nov. 22, 2019

(86) PCT No.: PCT/EP2019/082277
§ 371 (c)(1),
(2) Date: May 19, 2022

(87) PCT Pub. No.: WO2021/098972
PCT Pub. Date: May 27, 2021

(65) Prior Publication Data
US 2022/0416400 A1    Dec. 29, 2022

(51) Int. Cl.
*H04B 7/185*    (2006.01)
*H01Q 1/18*    (2006.01)
(Continued)

(52) U.S. Cl.
CPC .............. *H01Q 1/185* (2013.01); *H01Q 1/28* (2013.01); *H01Q 3/04* (2013.01); *H01Q 3/242* (2013.01);
(Continued)

(58) Field of Classification Search
CPC .......... H01Q 1/18; H01Q 1/185; H01Q 1/246; H01Q 1/28; H01Q 21/205; H01Q 25/00; H01Q 3/04; H01Q 3/08; H01Q 3/242; H04B 7/18506; H04B 7/185; H04B 7/18502; H04B 7/0634; H04B 7/082;
(Continued)

(56) References Cited

U.S. PATENT DOCUMENTS 5,049,891 A * 9/1991 Ettinger ................... H01Q 3/04
343/705
5,202,695 A 4/1993 Hollandsworth et al.
(Continued)

FOREIGN PATENT DOCUMENTS

CN    2924613 Y    7/2007
WO    2015/139733 A1    9/2015

OTHER PUBLICATIONS

International Search Report and Written Opinion dated Sep. 14, 2020 in International Application No. PCT/EP2019/082277 (10 pages).

*Primary Examiner* — Andrew Wendell
(74) *Attorney, Agent, or Firm* — Rothwell, Figg, Ernst & Manbeck, P.C.

(57) ABSTRACT

A technique for controlling an airborne antenna system (304) for a radio telecommunications network mounted on an aircraft (300) is described. As to a method aspect performed by the aircraft (300), a physical antenna orientation of the antenna system (304) relative to geographic cardinal directions is determined. The physical antenna orientation is stabilized in a predefined direction relative to the geographic cardinal directions by controlling a rotational actuator (514) of the antenna system (304).

18 Claims, 16 Drawing Sheets

(51) Int. Cl.
  *H01Q 1/28* (2006.01)
  *H01Q 3/04* (2006.01)
  *H01Q 3/24* (2006.01)
  *H01Q 21/20* (2006.01)
  *H04W 4/42* (2018.01)
  *H04W 4/06* (2009.01)

(52) U.S. Cl.
  CPC ....... *H01Q 21/205* (2013.01); *H04B 7/18506* (2013.01); *H04W 4/06* (2013.01)

(58) Field of Classification Search
  CPC ....... H04B 7/0865; H04B 17/12; H04W 4/06; H04W 4/42; H04W 84/06
  USPC ....................................................... 455/11.1
  See application file for complete search history.

(56) References Cited

U.S. PATENT DOCUMENTS

| | | | |
|---|---|---|---|
| 6,844,856 B1 * | 1/2005 | Wright | H01Q 1/18 343/705 |
| 7,072,977 B1 * | 7/2006 | Bernard | H04B 7/18504 455/422.1 |
| 10,276,933 B1 * | 4/2019 | Chukka | H01Q 3/06 |
| 10,897,303 B1 * | 1/2021 | Ananth | H04B 7/0408 |
| 2003/0214454 A1 * | 11/2003 | Quagliaro | H01Q 1/28 343/705 |
| 2005/0146473 A1 * | 7/2005 | Stoyanov | H01Q 1/3275 343/753 |
| 2007/0215746 A1 * | 9/2007 | Rieken | B64C 39/06 244/45 R |
| 2010/0271274 A1 * | 10/2010 | Gibson | H01Q 3/02 343/705 |
| 2011/0304496 A1 * | 12/2011 | Yakubovich | H01Q 19/192 342/359 |
| 2014/0225767 A1 * | 8/2014 | Cordone | H01Q 3/24 342/352 |
| 2017/0301987 A1 * | 10/2017 | Mack | H01Q 3/08 |
| 2018/0019516 A1 * | 1/2018 | Teague | B64D 43/00 |
| 2018/0089622 A1 * | 3/2018 | Burch, V | G05D 1/0094 |
| 2018/0145744 A1 * | 5/2018 | Petranovich | H04B 7/18515 |
| 2018/0351243 A1 * | 12/2018 | Lewis | H01Q 1/282 |
| 2021/0111485 A1 * | 4/2021 | Mak | H01Q 1/40 |
| 2022/0150719 A1 * | 5/2022 | Park | H04W 16/28 |
| 2022/0320710 A1 * | 10/2022 | Bekritsky | H04B 7/0617 |

\* cited by examiner

1200

TECHNIQUE FOR CONTROLLING AN AIRBORNE ANTENNA SYSTEM

CROSS REFERENCE TO RELATED APPLICATION(S)

This application is a 35 U.S.C. § 371 National Stage of International Patent Application No. PCT/EP2019/082277, filed Nov. 22, 2019.

TECHNICAL FIELD

The present disclosure relates to the physical antenna orientation of an airborne antenna system for a radio telecommunications network. More specifically, and without limitations, a method and a device for controlling an airborne antenna system for a radio telecommunications network mounted on an aircraft is provided.

BACKGROUND

International patent application WO 2015/139733 A1 discloses the deployment of conventional mobile robots for providing coverage of a radio telecommunications network, for example for use in urgent situations when the need for network capacity grows rapidly and it is urgent to create more and/or remote network coverage in an ad hoc fashion.

Conventional mobile robots comprise types of vehicles that move autonomously without human pilot, either autonomously on a pre-programmed path or steered from remote, such as unmanned aircraft vessels, unmanned land vehicles and unmanned marine vessels. Such vehicles could operate respectively in the air, on the land, on sea, or on in land water, wherein these vehicles typically have an own engine respectively jet, propeller, wheel, crawler, propeller screw, or hover propulsion and gear.

However, conventional mobile robots are deployed in a substantially stationary geographic position and comprise radio base station functionality for providing and maintaining wireless access to end user equipment (UE) in a geographic radio coverage area of the deployed mobile robots. For example, the document WO 2015/139733 A1 only considers conventional mobile robots, which are able to substantially hold their stationary positions, and thus, does not provide means to maintain the quality of the network coverage when wind conditions or additional transportation tasks require unmanned or manned aircrafts in motion.

SUMMARY

Accordingly, there is a need for a technique that allows rapidly deploying multiple types of aircrafts, such as conventional rescue aircrafts, for providing, extending or restoring a radio telecommunications network.

As to a method aspect, a method of controlling an airborne antenna system for a radio telecommunications network mounted on an aircraft is provided. The method comprises a step of determining a physical antenna orientation of the antenna system relative to geographic cardinal directions. The method further comprises a step of stabilizing the physical antenna orientation in a predefined direction relative to the geographic cardinal directions by controlling a rotational actuator of the antenna system.

In an embodiment, when the aircraft is in motion, such as rotating, traveling along a (e.g., curved) trajectory over ground, and/or changing its altitude over ground, the rotational actuator is reacting to the changes of direction of the aircraft (e.g., within the horizontal plane) so that the airborne antenna system is always oriented in a predefined direction relative to geographic cardinal directions. In particular, the method aspect may provide a stable orientation of the antenna system in the horizontal plane, optionally while taking into account an externally controlled offset. The offset may be a predefined azimuth angle, wherein azimuth may be defined as a horizontal angle measured clockwise from the north base line or meridian, or more generally horizontal angle measured clockwise from any fix reference plane or base direction line established (e.g., optically) from the aircraft.

Same or further embodiments can control the airborne antenna system, in particular its physical antenna orientation, mounted on an aircraft for a radio telecommunications network in response to a given flight trajectory, which may be determined or controlled by a purpose other than radio coverage, such as a rescue transportation and/or stealth navigation.

The method may be performed by the aircraft. The aircraft may be implemented by a flying mobile robot (also abbreviated by MR). Alternatively or in addition, the technique according to the present disclosure may be implemented by a control system or add-on unit configured to control the direction of the antenna system on any (e.g., manned or unmanned) aircraft or any flying mobile robot.

The airborne antenna system may function as a base station of the radio telecommunications network (or briefly: network). The network may be a radio access network (RAN), e.g., comprising one or a plurality of airborne antenna systems. Each of the airborne antenna systems may be able to communicate wirelessly with one or more radio devices such as a user equipment or UE (e.g., an end user equipment or wireless terminal). The antenna system may be configured for downlink (DL) transmission, uplink (UL) reception and/or backhaul communication.

Each of the one or more airborne antenna systems may function as an access point of the RAN. The UEs may be configured to communicate with one or more of the airborne antenna systems, which may in turn be used to connect to a wireless backhaul network and/or a core network (CN). Alternatively or in addition, each of the one or more antenna systems may function as a wireless backhaul network or may be configured to provide a backhaul link, e.g., to the CN of the radio telecommunications network.

In the radio telecommunications network, the airborne antenna system may be configured to transmit radio signals to one or multiple UEs within a geographical area served by and/or associated with the airborne antenna system, which may be referred to as a cell and/or coverage area. Alternatively or in addition, the antenna system may be configured to directionally transmit the radio signal, e.g., based on a physical antenna characteristic (which may also be referred as a transmission beam). Optionally, the method may comprise modifying the physical antenna characteristic according to different beam patterns.

As a consequence of the stabilization, embodiments can maintain a Quality of Service (QoS) level for the at least one served UE and/or a radio link between the airborne antenna system and the at least one served UE, e.g., even though the aircraft carrying the antenna system is moving. As an additional consequence, the number of handover or mobility events between the airborne antenna systems and/or other base stations of the radio telecommunications network can be minimized.

The rotational actuator of the antenna system may be or may comprise a stepper motor. The rotational actuator may be configured to rotate the antenna system, e.g., in the horizontal plane. Alternatively or in addition, the rotational actuator may comprise a shield. The antenna system (e.g., one or more the antennas of the antenna system) may be mounted on the shield which is rotated by the rotational actuator. The antenna system or the shield may be mounted on a two-axis stepper motor which can rotate according to a zenith angle (e.g., in a vertical plane for controlling an elevation of the transmit beam) and/or according to the azimuth angle (e.g., in a longitudinal and transverse plane of the aircraft). For example, the zenith angle may compensate a descent or a climb of the flight trajectory.

The aircraft may comprise a navigation unit. The determining step may be performed by the navigation unit. Alternatively or in addition, the aircraft may comprise a stabilization unit. The stabilizing step may be performed by the stabilization unit.

The antenna system may be configured to provide radio base station functionality or radio access to at least one radio device within range of the antenna system.

The method may further comprise a step of receiving a control signal from a control station external to the aircraft, the control signal being indicative of instructions for controlling the antenna system. Alternatively or in addition, the method may comprise a step of altering the predefined direction relative to the geographic cardinal directions for the antenna orientation according to the instructions.

The control station may be at least one of a stationary ground station and a radio base station. In at least some of the embodiments, the control station may be an evolved Node B, eNodeB. Such an eNodeB may provide evolved Multimedia Broadcast Multicast Service (eMBMS). The control signal may be broadcasted by the control station in a Multimedia Broadcast Service Area of the eMBMS.

The control signal of the control station may contain a radio telecommunications network identifier (ID) and/or may be encrypted with a public key of the radio telecommunications network, preferably of the aircraft.

Each aircraft may have a separate identifier and its separate public and private cryptographic keys. A network comprising at least one aircraft may have its separate identifier as well as private and public cryptographic keys. In order to address the correct network and/or aircrafts it is supposed to be configured, the control station may have knowledge of the public keys for all relevant networks and/or aircrafts.

Alternatively or in addition, the control station may have its separate private and public cryptographic keys. In this case, the public key of the control station is known to the aircrafts.

Furthermore, the method may comprise a step of transmitting a response signal to the control station, the response signal being indicative of whether altering the predefined direction relative to the geographic cardinal directions for the antenna orientation according to the instructions was successful.

In at least some of the embodiments, the antenna system comprises a multi-sector antenna. The multi-sector antenna may be configured to provide radio base station functionality or radio access to at least one radio device within each of multiple sectors of the antenna system. A carrier frequency may be re-used between different sectors of the antenna system.

Alternatively, the antenna system may be a Massive MIMO (Massive Multiple Input Multiple Output) antenna system and/or an Advanced Antenna System (AAS).

The method step of altering the predefined direction relative to the geographic cardinal directions for the antenna orientation according to the instructions may comprise a step of determining a rotation angle $\alpha$ for altering the predefined direction relative to the geographic cardinal directions for the antenna orientation according to the instructions. Optionally, the rotation angle $\alpha$ maybe be reduced by a modulus operation according to a sector angle $\Omega$ as the modulus of the modulus operation.

Alternatively or in addition, the method step of altering the predefined direction relative to geographic cardinal directions for the antenna orientation according to the instruction may comprise a method step of rotating the antenna system by the rotation angle $\alpha$, if the value of the rotation angle $\alpha$ is smaller than or equal to the absolute value of a sector angle $\Omega$ divided by 2. The sector angle $\Omega$ may correspond to 360° divided by a number of sectors of the multi-sector antenna or 360° divided by the order of a rotational symmetry of the antenna system.

In at least some of the embodiments, the method step of altering the predefined direction relative to geographic cardinal directions for the antenna orientation according to the instruction may comprise the step of rotating the antenna system by the rotation angle $\beta$ corresponding to the difference of the rotation angle $\alpha$ and the sector angle $\Omega$, if the absolute value of the rotation angle $\alpha$ is greater than the value of the sector angle $\Omega$ divided by 2 and the rotation angle $\alpha$ is greater than 0.

Alternatively or in addition, the method step of altering the predefined direction relative to geographic cardinal directions for the antenna orientation according to the instruction may comprise a method step of rotating the antenna system by the rotation angle $\beta$ corresponding to the sum of the rotation angle $\alpha$ and the sector angle $\Omega$, if the absolute value of the rotation angle $\alpha$ is greater than the value of the sector angle $\Omega$ and the rotation angle $\alpha$ is smaller than or equal to 0.

These above method steps of altering the predefined direction relative to geographic cardinal directions for the antenna orientation according to the instruction lead to a minimization of the antenna system rotation. Specifically, the rotation is minimized to a value smaller than a value of the sector angle $\Omega$ divided by 2.

This minimization of the rotation angle reduces the impact of the physical rotation of the antenna system on the aviation abilities of the aircraft.

Additionally, the limitations on the rotation angle provides safety for the electrical connections between a power source and the sectors of the multi-sector antenna. Damages of the electrical connections can be avoided which otherwise may occur when the electrical connections are in danger of being wrapped around the antenna. Moreover, more reliable electrical cables rather than abrasive contacts can be used.

Furthermore, altering the antenna orientation may comprise or lead to a switch (e.g., a switchover, preferably a cyclic switchover) of the sectors serving one or more UEs. The switch may be based on intra-frequency handover between the sectors of the multi-sector antenna. In case of the switch (e.g., an intra-frequency handover), the aircraft or a device performing the method and/or the control station may buffer downlink traffic for each served UE in the last moment before the physical rotation of the antenna system. After each successful intra-handover of the served UEs, the buffers (e.g., the contents of the buffers) are released to the respective UEs.

There are several possibilities to determine the geographic cardinal directions. In at least some of the embodiments, the geographic cardinal directions may be determined using avionics of the aircraft and/or by means of at least one of a magnetic compass and an inertial sensor.

Alternatively or in addition, the step of determining the geographic cardinal directions may comprise tracking stationary objects, preferably by means of an optical camera.

Further alternatively or in addition, the step of determining the geographic cardinal directions may comprise the step of receiving radio signals from at least four navigation satellites and/or ground-based navigation points, wherein the geographic cardinal directions are determined based on the received radio signals. Optionally, the antenna orientation of the antenna system may be stabilized relative to geographic cardinal directions based on the radio signals.

An axis of rotation of the rotational actuator may be vertical. Herein, "vertical" may refer to the direction of gravity.

According to the method of the first aspect, the antenna orientation may be stabilized in a fixed direction relative to the geographic cardinal directions while the aircraft is moving on a trajectory over ground.

In at least some of the embodiments, the aircraft may follow a trajectory over ground and the antenna orientation may stabilized by rotating the antenna system in a counter direction of a curvature of the trajectory.

The trajectory of the aircraft may comprise a closed loop (e.g., over ground), for example, an ellipse or circle. The method may comprise a step of providing radio access to at least one radio device (e.g., a UE) within a coverage area (e.g., a cell) by means of the antenna system. A linear size of the coverage area may be greater than a diameter of the closed loop or circle. Alternatively or in addition, a lateral distance or distance over ground between the coverage area and the closed loop or circle may be greater than the linear size of the coverage area.

In these embodiments, the ratio between the distance between the coverage area and the loop or circle and the diameter of the loop or circle may be large enough to maintain the Quality of Service (QoS) level between the airborne antenna system and the one or more served UEs, even though the aircraft carrying the antenna system is moving along the closed loop or circle.

Different types of aircrafts may perform the method of the present disclosure. In at least some of the embodiments, the aircraft may be a fixed-wing aircraft, wherein the antenna system may be rotatably mounted on a body of the fixed-wing aircraft. The antenna orientation of the antenna system may be controlled by rotating the antenna system relative to a body of the fixed-wing aircraft.

Alternatively, the aircraft may be a rotary-wing aircraft functioning as the rotational actuator. The antenna system may be fixedly mounted on a body (e.g. an airframe) of the rotary-wing aircraft. The antenna orientation of the antenna system may be controlled by rotating the body of the rotary-wing aircraft.

Further alternatively, the aircraft may be a rotary-wing aircraft, wherein the antenna system may be rotatably mounted on a body of the rotary-wing aircraft. The antenna orientation of the antenna system may be controlled by rotating the antenna system relative to a body of the rotary-wing aircraft.

Furthermore, the aircraft may be a flying unmanned vessel, also called mobile robot or drone.

The body of the aircraft may comprise a fuselage or one or more wings of the aircraft.

In at least some embodiments, the antenna system may be rotatably mounted on the aircraft's fuselage or under one of the wings.

Furthermore, power may be provided to the antenna system by a power source. In at least some of the embodiments, the antenna system may comprise the power source. The power source may be collocated with the antenna system. Alternatively, power may be provided to the antenna system by a power source of the aircraft.

At least one of the antenna system and the power source may be arranged in a casing and/or mounted on the rotational actuator. In other embodiments, wherein the antenna system may be mounted in or on a first pylon under a wing and the power source (e.g., of approximately the same mass and/or approximately the same moment of inertia as the antenna system) may be mounted on a second pylon under opposite wing for reasons of balance. The power source may rotate in the same or the opposite direction as the antenna system.

A plurality of aircrafts each implementing the method may be arranged and/or deployed in a so-called daisy chain or loop, e.g. for forwarding and/or exchanging data and/or control signals.

The method may further comprise the step of communicating with another aircraft, which is configured to perform the method, using at least one of directional and modulated light of a light amplification by stimulated emission of radiation (LASER), a directional and modulated microwave of a microwave amplification by stimulated emission of radiation (MASER), a backhaul radio link or a radio sidelink, and an X2 Application Protocol (X2AP).

As to another aspect, a computer program product is provided. The computer program product comprises program code portions for performing any one of the steps of the method aspect disclosed herein when the computer program product is executed by one or more computing devices. The computer program product may be stored on a computer-readable recording medium. The computer program product may also be provided for download, e.g., via a radio access network, RAN, the Internet and/or a host computer. Alternatively, or in addition, the method may be encoded in a Field-Programmable Gate Array (FPGA) and/or an Application-Specific Integrated Circuit (ASIC), or the functionality may be provided for download by means of a hardware description language.

As to a device aspect, a device for controlling an airborne antenna system for a radio telecommunications network mounted on an aircraft is provided. The device is configured to determine a physical antenna orientation of the antenna system relative to geographic cardinal directions. The device is further configured to stabilize the physical antenna orientation in a predefined direction relative to the geographic cardinal directions by controlling a rotational actuator of the antenna system.

Alternatively or in addition, the device may be configured to perform any one of the steps of the method aspect and/or to comprise any feature disclosed in the context of the method aspect.

The device or components of the device may be embodied by components already available in the aircraft.

As to another device aspect, a device for controlling an airborne antenna system for a radio telecommunications network mounted on an aircraft is provided, wherein the device comprises at least one processor and a memory, said memory comprising instructions executable by said at least one processor. The device is operative to determine a physical antenna orientation of the antenna system relative to geographic cardinal directions, and stabilize the physical antenna orientation in a predefined direction relative to the geographic cardinal directions by controlling a rotational actuator of the antenna system.

Alternatively or in addition, the device may be operative to perform any one of the steps of the method aspect and/or to comprise any feature disclosed in the context of the method aspect.

As to a further aspect, a communication system including a host computer is provided. The host computer comprises a processing circuitry configured to provide user data, e.g. transmitted to the airborne antenna system. The host computer may further comprise a communication interface configured to forward the user data to a cellular network (e.g., the RAN and/or a base station) for transmission to a radio device (e.g., a UE), preferably via the airborne antenna system. A processing circuitry of the cellular network may be configured to execute any one of the steps of the method aspect.

The communication system may further include the radio device (e.g., the UE). Alternatively or in addition, the cellular network may further include one or more of the base stations configured for radio communication with the radio device and/or one or more embodiments of device aspect (e.g., one or more airborne antenna systems) to provide a data link between the radio device and the host computer, preferably using the method aspect.

The processing circuitry of the host computer may be configured to execute a host application, thereby providing the user data and/or any host computer functionality described herein. Alternatively, or in addition, the processing circuitry of the radio device may be configured to execute a client application associated with the host application.

Any one of the devices, the airborne antenna systems, the base stations, the radio devices (e.g., UEs), the communication system or any node or station for embodying the technique may further include any feature disclosed in the context of the method aspect, and vice versa. Particularly, any one of the units and modules disclosed herein may be configured to perform or initiate one or more of the steps of the method aspect.

BRIEF DESCRIPTION OF THE DRAWINGS

Further details of embodiments of the technique are described with reference to the enclosed drawings, wherein.

DETAILED DESCRIPTION

In the following description, for purposes of explanation and not limitation, specific details are set forth, such as a specific network environment in order to provide a thorough understanding of the technique disclosed herein. It will be apparent to one skilled in the art that the technique may be practiced in other embodiments that depart from these specific details. Moreover, while the following embodiments are primarily described for the Universal Mobile Telecommunications System (UMTS) and the Global System for Mobile Communications (GSM), it is readily apparent that the technique described herein may also be implemented for any other radio communication technique, including a Wireless Local Area Network (WLAN) implementation according to the standard family IEEE 802.11, a 3GPP New Radio (NR) or 5G implementation, 3GPP LTE (e.g., LTE-Advanced or a related radio access technique such as MulteFire), for Bluetooth according to the Bluetooth Special Interest Group (SIG), particularly Bluetooth Low Energy, Bluetooth Mesh Networking and Bluetooth broadcasting, for Z-Wave according to the Z-Wave Alliance or for ZigBee based on IEEE 802.15.4.

Moreover, those skilled in the art will appreciate that the functions, steps, units and modules explained herein may be implemented using software functioning in conjunction with a programmed microprocessor, an Application Specific Integrated Circuit (ASIC), a Field Programmable Gate Array (FPGA), a Digital Signal Processor (DSP) or a general purpose computer, e.g., including an Advanced RISC Machine (ARM). It will also be appreciated that, while the following embodiments are primarily described in context with methods and devices, the invention may also be embodied in a computer program product as well as in a system comprising at least one computer processor and memory coupled to the at least one processor, wherein the memory is encoded with one or more programs that may perform the functions and steps or implement the units and modules disclosed herein.

Figure 1:
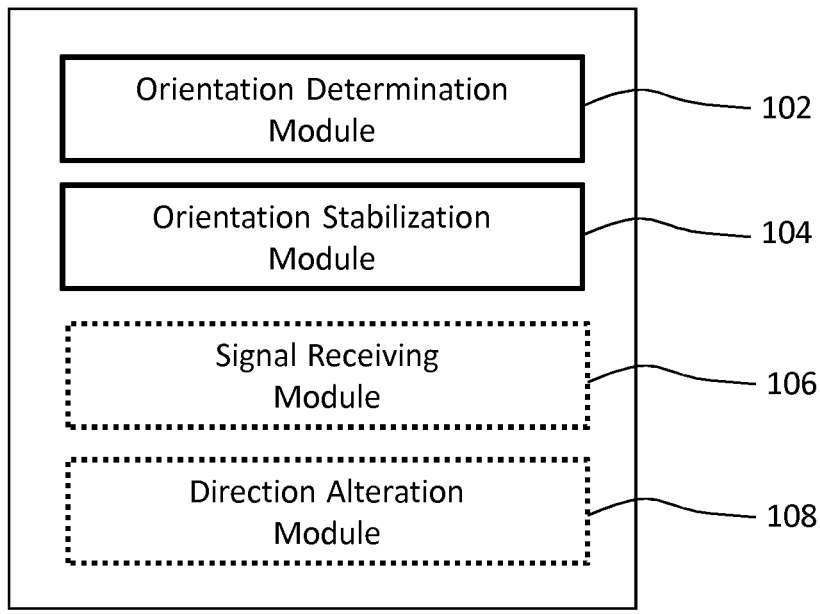
FIG. 1 shows a schematic block diagram of an embodiment for controlling an airborne antenna system for a radio telecommunications network mounted on an aircraft.

FIG. 1 schematically illustrates a block diagram of an embodiment of a device for controlling an airborne antenna system for a radio telecommunications network mounted on an aircraft. The device is generically referred to by reference sign 100.

The device 100 comprises the orientation determination module 102 that determines the physical antenna orientation of the antenna system relative to geographic cardinal directions. The device 100 further comprises an orientation stabilization module 104 that stabilizes the physical antenna orientation in a predefined direction relative to the geographic cardinal directions by controlling a rotational actuator of the antenna system.

Optionally, the device 100 further comprises a signal receiving module 106 and/or a direction alteration module 108. The signal receiving module 106 receives a control signal from a control station external to aircraft, the control signal being indicative of instructions for controlling the antenna system. The direction alteration module 108 alters the predefined direction relative to the geographic cardinal directions for the antenna orientation according to the instructions.

Any of the modules of the device 100 may be implemented by units configured to provide the corresponding functionality.

The device 100 may also be referred to as, or may be embodied by or a component of, an aircraft. Any component of the device 100 may be embodied using components already available in an aircraft.

Figure 2:
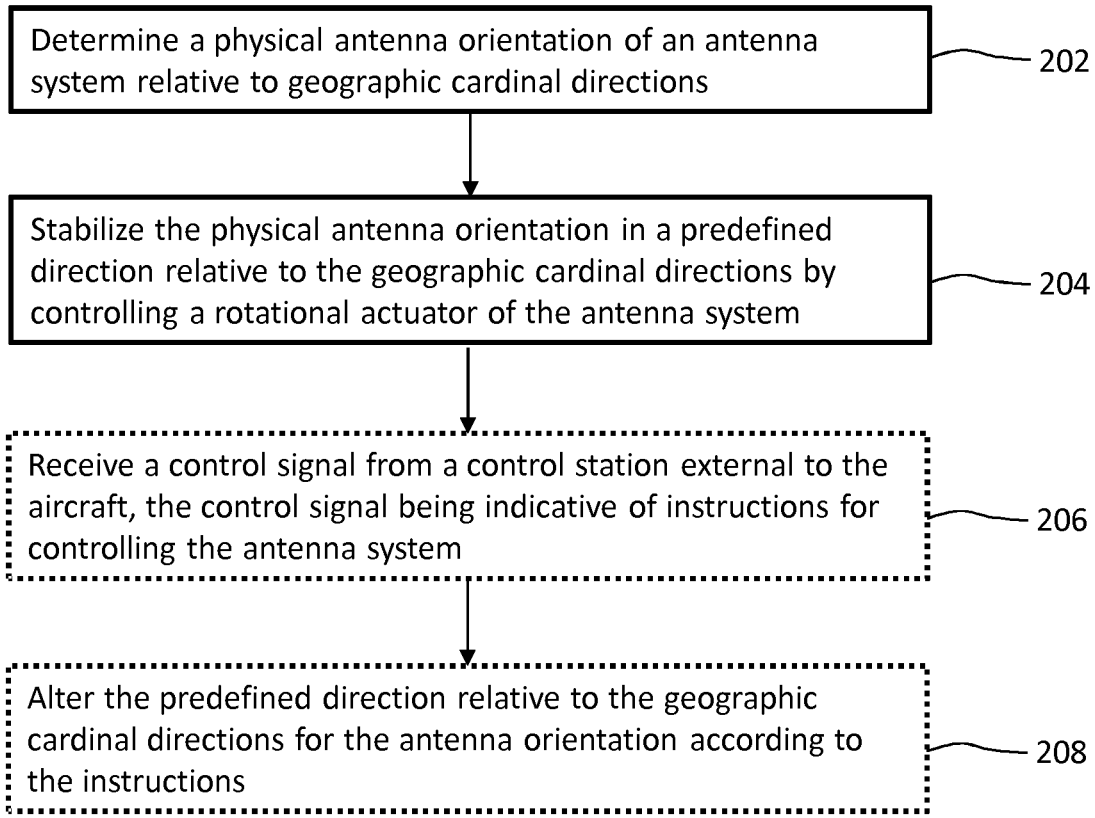
FIG. 2 shows a flowchart for a method embodiment for controlling an airborne antenna system for a radio telecommunications network mounted on an aircraft, which method may be implementable by the device of FIG. 1.

FIG. 2 shows an example flowchart for a method 200 for controlling an airborne antenna system for a radio telecommunications network mounted on an aircraft.

In the step 202, a physical antenna orientation of an antenna system relative to geographic cardinal directions is determined. In the step 204, the physical antenna orientation is stabilized in a predefined direction relative to geographic cardinal directions by controlling a rotational actuator of the antenna system.

Optionally, the method 200 may perform further steps. In the step 206, a control signal is received from a control station external to the aircraft, wherein the control signal is indicative of instructions for controlling the antenna system. In the step 208, the predefined direction relative to geographic cardinal directions for the antenna orientation is altered according to the instructions.

The method 200 may be performed by the device 100. For example, the modules 102, 104, 106 and 108 may perform the steps 202, 204, 206 and 208, respectively.

Figure 3A:
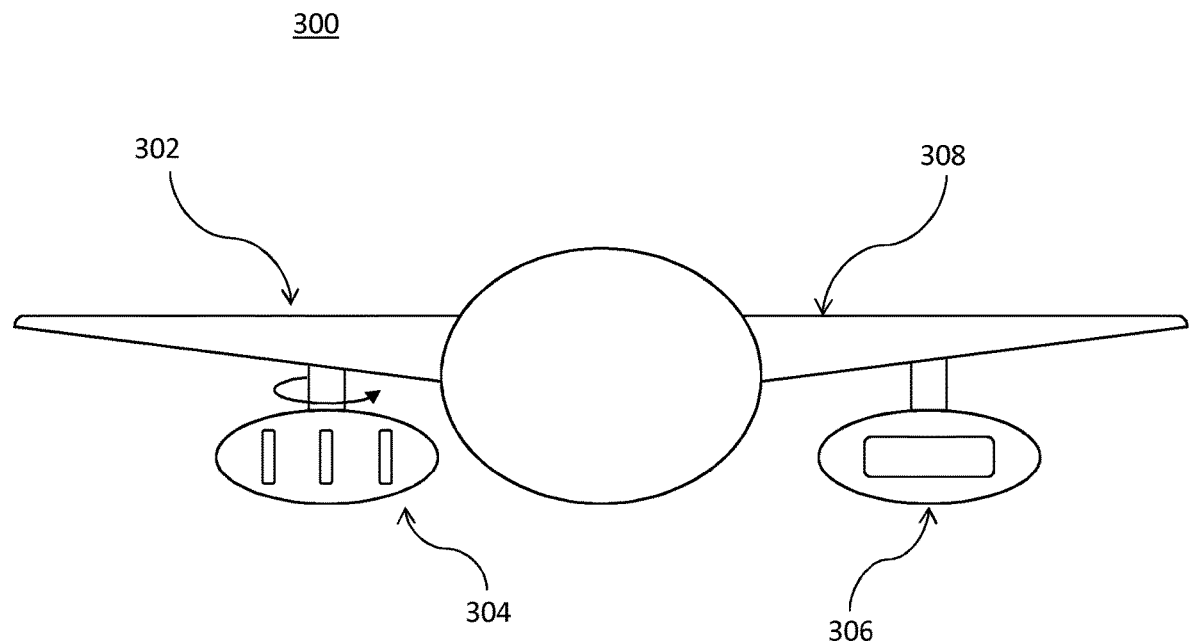
FIGS. 3A and 3B schematically illustrate embodiments, respectively, of an airborne antenna system for a radio telecommunications network mounted on an aircraft.
Figure 3B:
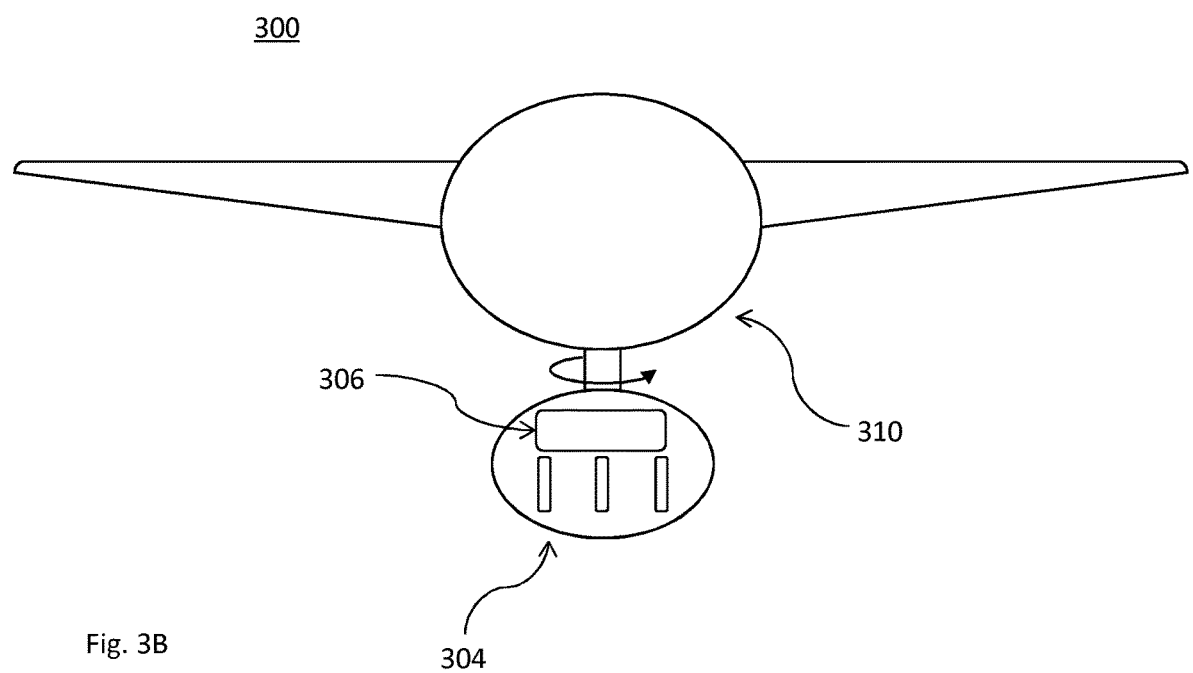

FIGS. 3A and 3B illustrate two embodiments, respectively, of the airborne antenna system for a radio telecommunications network mounted on an aircraft. Both embodiments use a fixed-wing aircraft. The antenna system is rotatably mounted on a body of the fixed-wing aircraft. The antenna orientation of the antenna system is controlled by rotating the antenna system relative to a body of the fixed-wing aircraft. The body of each aircraft comprises a fuselage or multiple wings. Furthermore, power is provided to the antenna system by a power source, wherein the antenna system comprises the power source and/or the power source is collocated with the antenna system.

In FIG. 3A, the antenna system 304 is rotatably mounted on a pylon on the bottom side of a first wing 302 of the aircraft 300. The power source 306 of the antenna system 304 is mounted on another pylon on the bottom side of a second wing 308 of the aircraft 300. The second wing 308 is opposite to the first wing 302.

In FIG. 3B, the antenna system 304 and the power source 306 are mounted in the same casing on the bottom side of the fuselage 310 of the aircraft 300. In a variant, at least one of the antenna system 304 and the power source 306 are mounted on the top side of the fuselage 310 of the aircraft 300.

In other embodiments, the aircraft is a rotary-wing aircraft. The rotary-wing aircraft may function as the rotational actuator, wherein the antenna system is fixedly mounted on a body of the aircraft, and the antenna orientation of the antenna system is controlled by rotating the body of aircraft. Alternatively, the antenna system may be rotatably mounted on a body of the rotary-wing aircraft, wherein the antenna orientation of the antenna system may be controlled by rotating the antenna system relative to a body of the aircraft.

Figure 4:
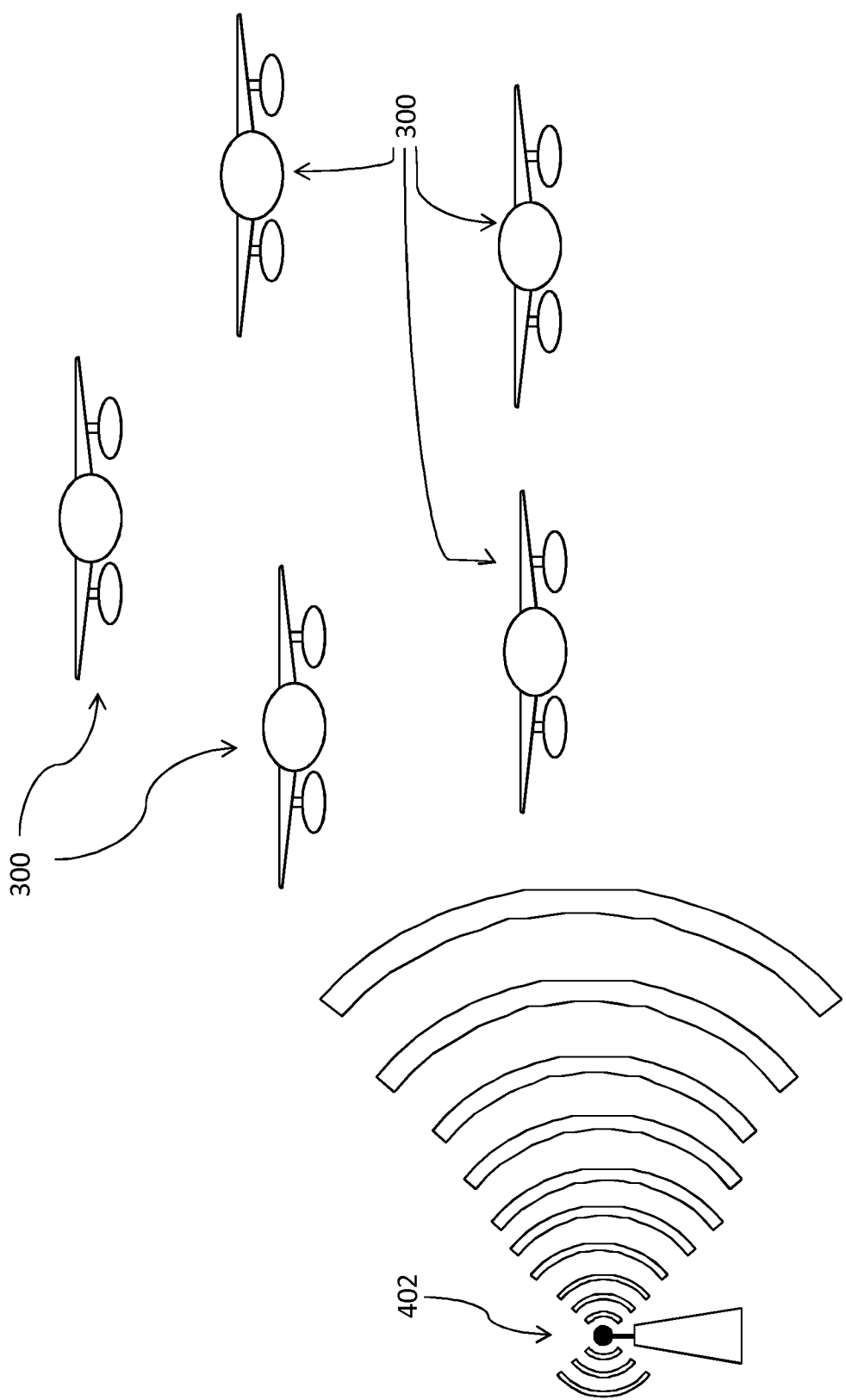
FIG. 4 schematically illustrates an exemplary embodiment of a control station broadcasting a control signal to be received by multiple aircrafts, wherein an airborne antenna system for a radio telecommunications network is mounted on each of the aircrafts.

FIG. 4 illustrates an exemplary embodiment of a control station broadcasting a control signal to be received by multiple aircrafts, wherein an airborne antenna system for a radio telecommunications network is mounted on each of the aircrafts. For example, each of the multiple aircrafts may be an embodiment of the device 100 and/or may be configured to perform any method embodiment of the method 200.

The control station 402 may be at least one of a stationary ground station and a radio base station. For example, the control station is an evolved Node B (eNodeB).

The control signals to be received by the aircrafts 300 may be broadcasted by the control station 402 using evolved Multimedia Broadcast Multicast Service (eMBMS). The control signal is broadcasted in a Multimedia Broadcast Service Area of the eMBMS.

The control signal may contain a radio telecommunications network identifier (ID) and is encrypted with the public key of radio telecommunications network so that the control signal can only be decrypted and read by aircrafts which are aware of the correct ID and public key.

Additionally, the aircrafts 300 each embodying a device 100 may be able to communicate with each other. Various communication techniques may be implemented, such as directional and modulated light of a light amplification by stimulated emission of radiation (LASER), a directional and modulated microwave of a microwave amplification by stimulated emission of radiation (MASER), a backhaul radio link or a radio sidelink, and/or an X2 Application Protocol (X2AP).

Figure 5:
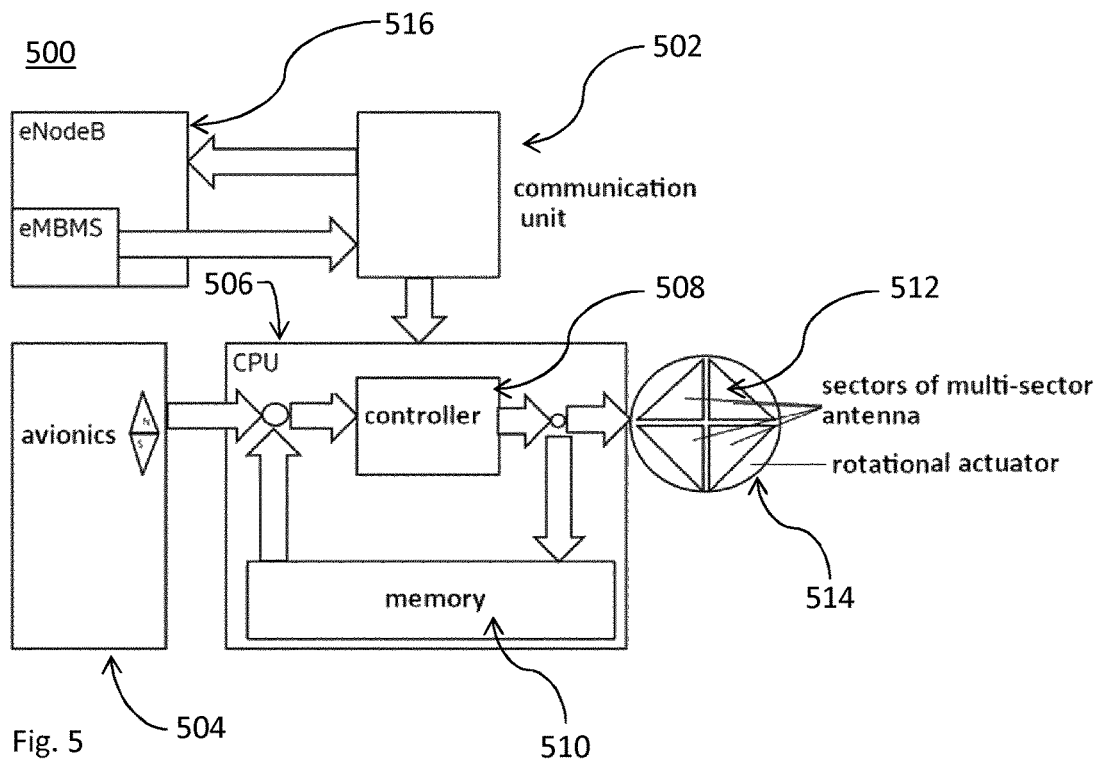
FIG. 5 schematically illustrates a further embodiment of the device of FIG. 1 in communication with a control station (e.g., an eNodeB) for controlling the orientation of the antenna system.

FIG. 5 illustrates an exemplary embodiment of the device 100 which is in communication with the control station (e.g. an eNodeB) and controlling the orientation of the antenna system.

In this embodiment, the device 100 comprises a communications unit 502 (e.g., configured to perform the step 206 of the method 200), an avionics unit 504 (e.g., configured to perform the step 202 of the method 200) and/or a CPU 506. The CPU 506 may further comprise a controller 508 and a memory 510.

The CPU 506 may be configured to perform at least one of the steps 204 and 208 of the method 200. Optionally, the CPU 506 may be further configured to trigger or initiate at least one of the steps 202 and 206 of the method 200.

The antenna system 304 may be or may comprise a multi-sector antenna 512.

The avionics unit 504 may be embodied by the avionics of the aircraft 300, e.g., by means of at least one of a magnetic compass and an inertial sensor and/or means of an optical camera for tracking stationary objects, preferably by means of an optical camera. Alternatively or in addition, the geographic cardinal directions may be determined by receiving radio signals from at least four navigation satellites and/or ground-based navigation points, wherein the geographic cardinal directions are determined based on the received radio signals (e.g., a difference in a propagation time of the received radio signals).

The communications unit 502 is communicating with the external eNodeB 516, which may be an example of the control station. For example, the eNodeB 516 broadcasts the control signal via eMBMS. The control signal is received by the communications unit 502 of the device 100 and then sent to the CPU 506 to be stored in the memory 510. Based on the instructions for controlling the antenna system indicated by the control signal and the current direction of the antenna system relative to the geographic cardinal directions determined by the avionics unit 504, the controller 508 determines the rotation angle to alter the direction of the antenna system according to the instructions. Subsequently, the controller 508 controls the rotational actuator 514 to rotate the multi-sector antenna 512 accordingly by the determined rotation angle.

The multi-sector 512 is rotatable in the horizontal plane, wherein the axis of rotation of the rotational actuator 514 is vertical.

Figure 6:
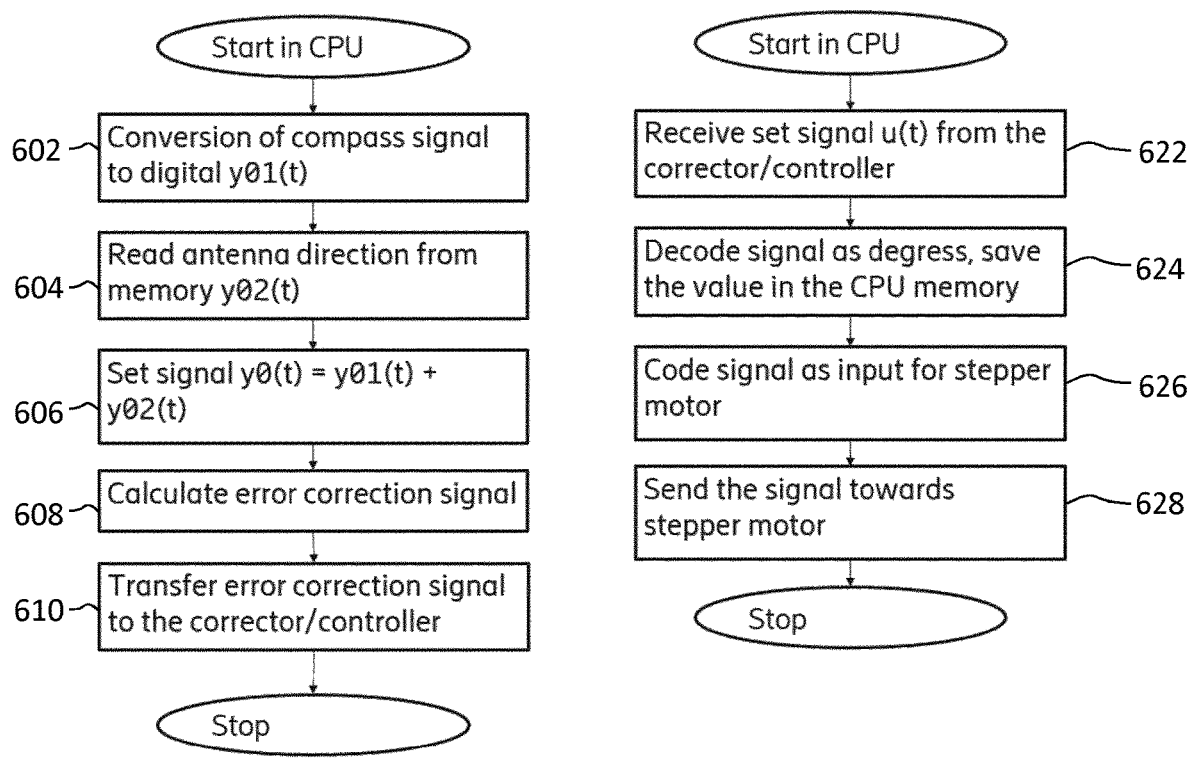
FIG. 6 shows a flowchart for implementing the method, preferably for implementing the step of stabilizing the physical antenna orientation in a predefined direction relative to the geographic cardinal directions by controlling a rotational actuator of the antenna system.

FIG. 6 shows a flowchart of an embodiment of the device 100 stabilizing the physical antenna orientation in a predefined direction relative to the geographic cardinal directions by controlling a rotational actuator of the antenna system. In particular, FIG. 6 explains the method steps performed by the CPU 506 in FIG. 5 in more detail. In this embodiment, the avionics unit 504 is realized by a compass and the rotational actuator 514 is realized by a stepper motor.

In the step 602, the compass signal, which indicates the current direction of the antenna system relative to geographic cardinal directions, is conversed to a digital coordinate y01(t). In the step 604, the antenna direction y02(t) is read from memory, wherein y02(t) corresponds to the predefined antenna direction according to the instructions indicated by the control signal. The difference signal y0(t) of both directions y01(t) and y02(t) is determined in step 606 in order to calculate an error correction signal and transfer said error correction signal to the controller (steps 608, 610). The difference signal y0(t) indicates whether the current orientation of the antenna system corresponds to the predefined direction or whether a correction of the current orientation is necessary.

In the steps 622 and 624, the error correction signal u(t) is received by the controller, decoded in units of degrees and stored in the CPU memory. In the steps 626 and 628, the error correction signal is used as input for the stepper motor in order to correct the orientation of the antenna system and thus stabilize the physical antenna orientation in the predefined direction relative to geographic cardinal directions according to the instructions indicated by the control signal and saved in the CPU memory.

Figure 7:
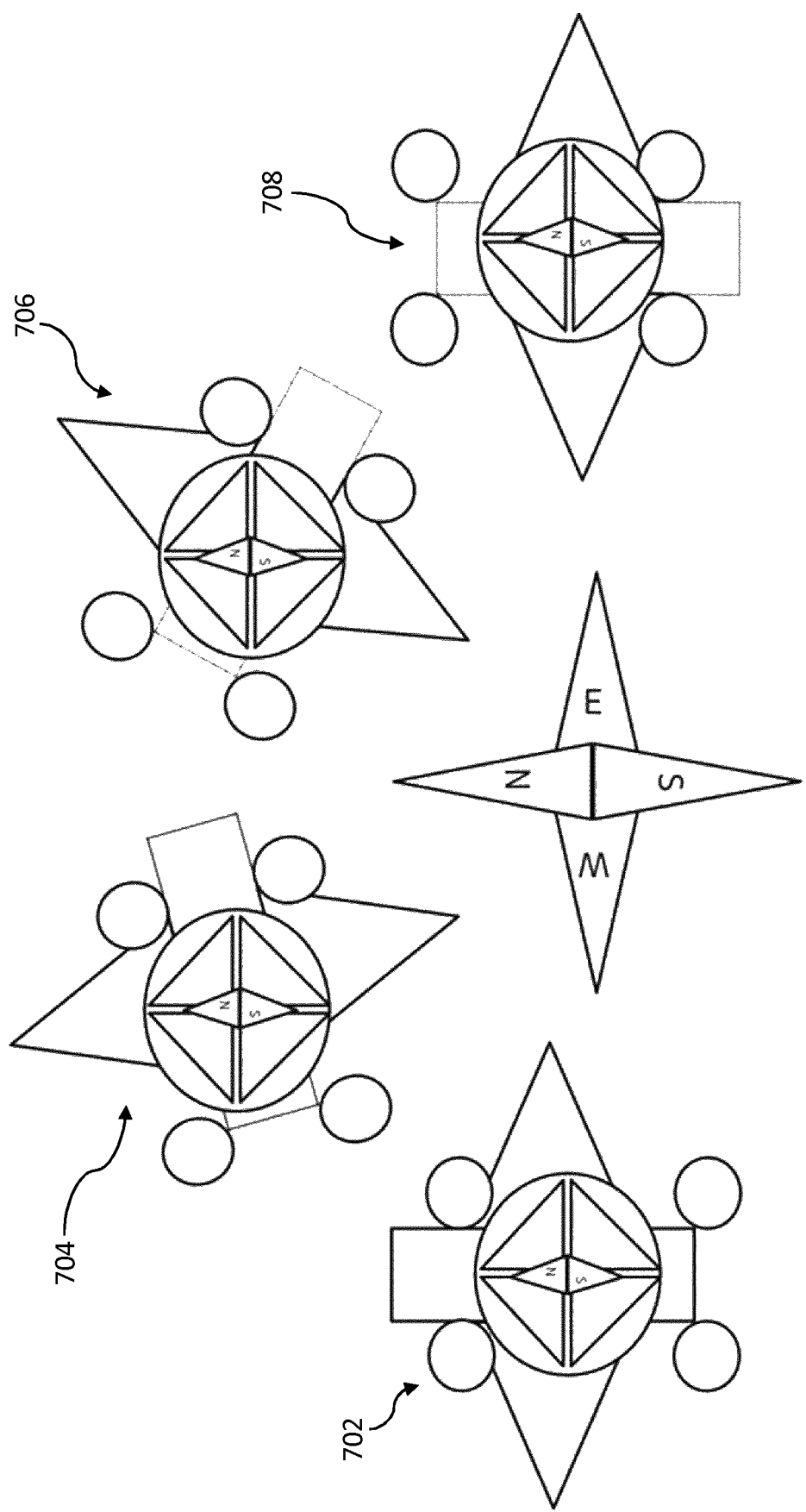
FIG. 7 illustrates an embodiment of the aircraft travelling along a curved trajectory, while the antenna system is stabilized relative to geographic cardinal directions according to an embodiment of the method of FIG. 2.

FIG. 7 illustrates an aircraft travelling along a curve trajectory, while the antenna system is stabilized relative to geographic cardinal directions. A single aircraft is shown at four different times and positions, traveling in north direction at 702 and then traveling along a curve trajectory at 704 and 706, until the aircraft is heading in south direction at 708.

At all time (e.g., at all four illustrated points in time), the antenna orientation is stabilized in a fixed direction relative to the geographic cardinal directions. This may be achieved by rotating the antenna system in a counter direction of the curvature of the trajectory.

Figure 8:
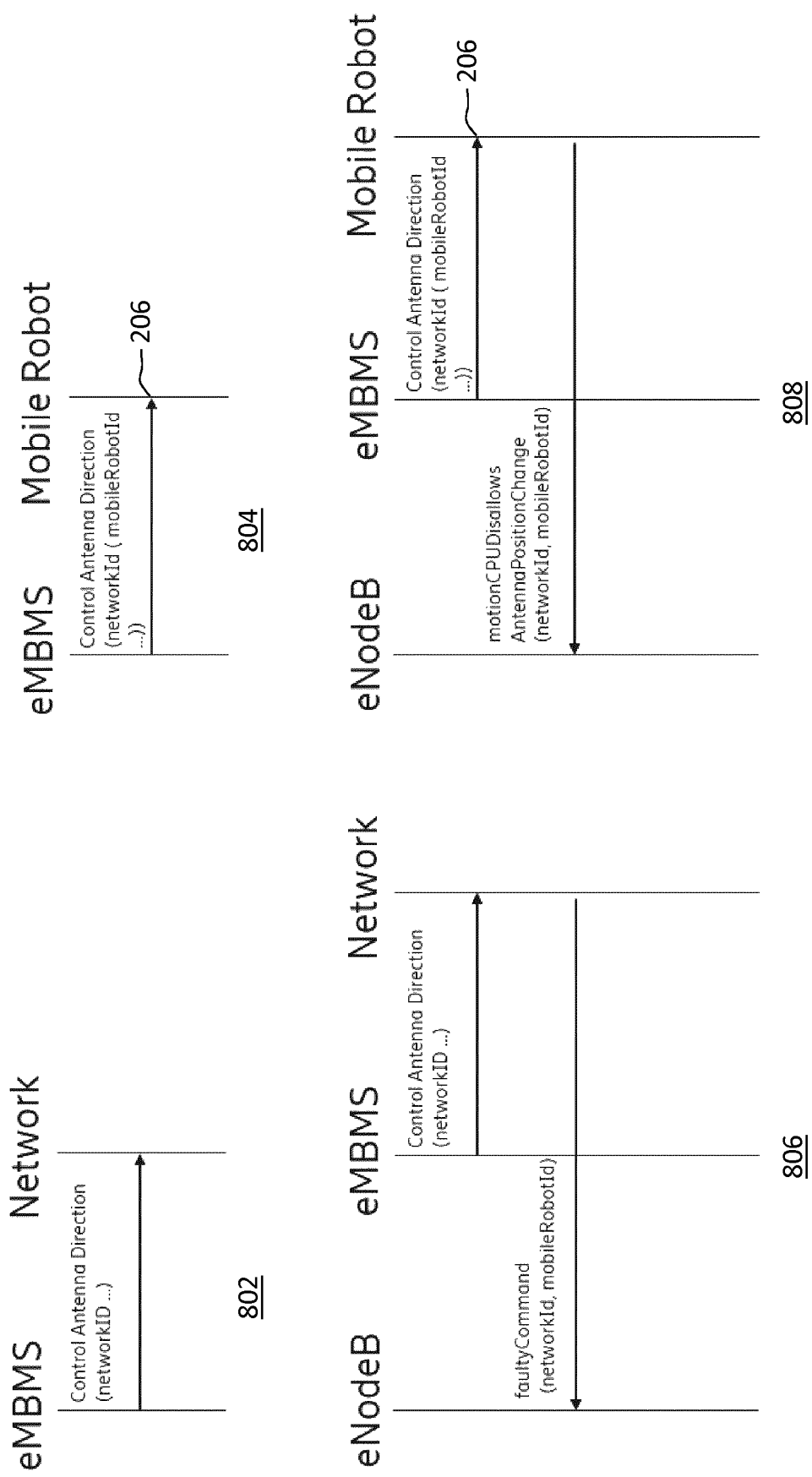
FIG. 8 illustrates an exemplary communication between the control station (e.g., eNodeB) and the aircraft (e.g., mobile robot) using eMBMS.

FIG. 8 illustrates an exemplary communication between the control station (e.g., an eNodeB) and the aircraft (e.g., a mobile robot). In other words, the control station is in communication with a network comprising at least one airborne antenna system mounted on an aircraft. The communication may use eMBMS.

As illustrated at reference sign 802, the control station (e.g., the control station 516) may send a control signal to a network in order to alter the predefined direction relative to the geographic cardinal directions for the antenna orientation of at least one or all airborne antenna systems of the network. An exemplary command may be "Control Antenna Direction (networkID . . . )", wherein "networkID" is the identifier of the specific network to be addressed by the control station."

Optionally, the control station may send a control signal to a particular aircraft (which is illustrated at reference sign 804), e.g., in order to alter the predefined direction relative to geographic cardinal directions for the antenna orientation of only one airborne antenna system. An exemplary command may be "Control Antenna Direction (networkID(mobileRobotID . . . ))". The aircraft on which the specific antenna system is mounted is part of the network having the identifier "networkID", wherein "mobileRobotID" is the identifier of the aircraft.

The network or the aircraft may send in response a signal back to the control station, e.g., as illustrated in at reference signs 806 and 808. For example, the network may send a response signal that the command of the control signal is faulty by sending the response "faultyCommand (networkID, mobileRobotId)". As another example, the aircraft may send a response signal that the alteration of the antenna orientation is not allowed by sending the response "motionCPUDisallowsAntennaPositionChange (networkID, mobileRobotId)".

A control signal may be generated by the following example code:

```
Value ::= CHOICE {
  Integer,
  Float
}
ValueUnit := ENUMERATED {
  Radians,
  Degrees,
  Special
}
MovementPlane ::= ENUMERATED {
  HorizontalPlane,
  VerticalLongitudinal,
  VerticalTransverse
}
ChangeOffset ::== SEQUENCE {
  movementPlane [0] MovementPlane,
  valueUnit [1] ValueUnit,
  value [2] Value
}
ResetPosition (eMBMS->MR_UE) ::= SEQUENCE {
  movementPlane [0] MovementPlane
}
Data ::= CHOICE {
```

-continued

```
resetPosition [0] ResetPosition;
changeOffset [1] ChangeOffset;
}
DataForMobileRobot ::= SEQUENCE {
robotId [0] OCTET STRING,
dataForRobot o(1) Data,
}
EncryptedDataForNetwork (encrypted) ::= CHOICE {
   dataForNetwork (0) Data,
   dataForMobileRobot (1) DataForMobileRobot
}
On Top Of eMBMS Control Antenna Direction OPERATION ::= {
ARGUMENT [3] SEQUENCE {
   networkID (0) OCTET STRING,
   encryptedDataforNetwork (1) EncryptedDataForNetwork,
   cryptographicSignature [2] INFINITE,
   RESULT NULL,
   ERROR (UE->eNodeB) {
   faultyCommand SEQUENCE {
       networkID (0) OCTET STRING,
       mobileRobotID (1) OCTET STRING OPTIONAL
   }
   motionCPUDisallowsAntennaPositionChange SEQUENCE {
       networkID (0) OCTET STRING,
       mobileRobotID (1) OCTET STRING OPTIONAL
   }
   CODE local:1
}
```

The blob of data, i.e. the content of the control signal, is encrypted with an aircraft's public key, if the control signal is directed at a single particular aircraft. The data contains the operation type: reset position and change offset of the predefined antenna orientation.

In general, references 806 and 808 are examples of the method 200 comprising an additional step of for transmitting a response signal to the control station, the response signal being indicative of whether altering the predefined direction relative to the geographic cardinal directions for the antenna orientation according to the instructions was successful. This additional step may be performed by a module of the device 100.

Figure 9A:
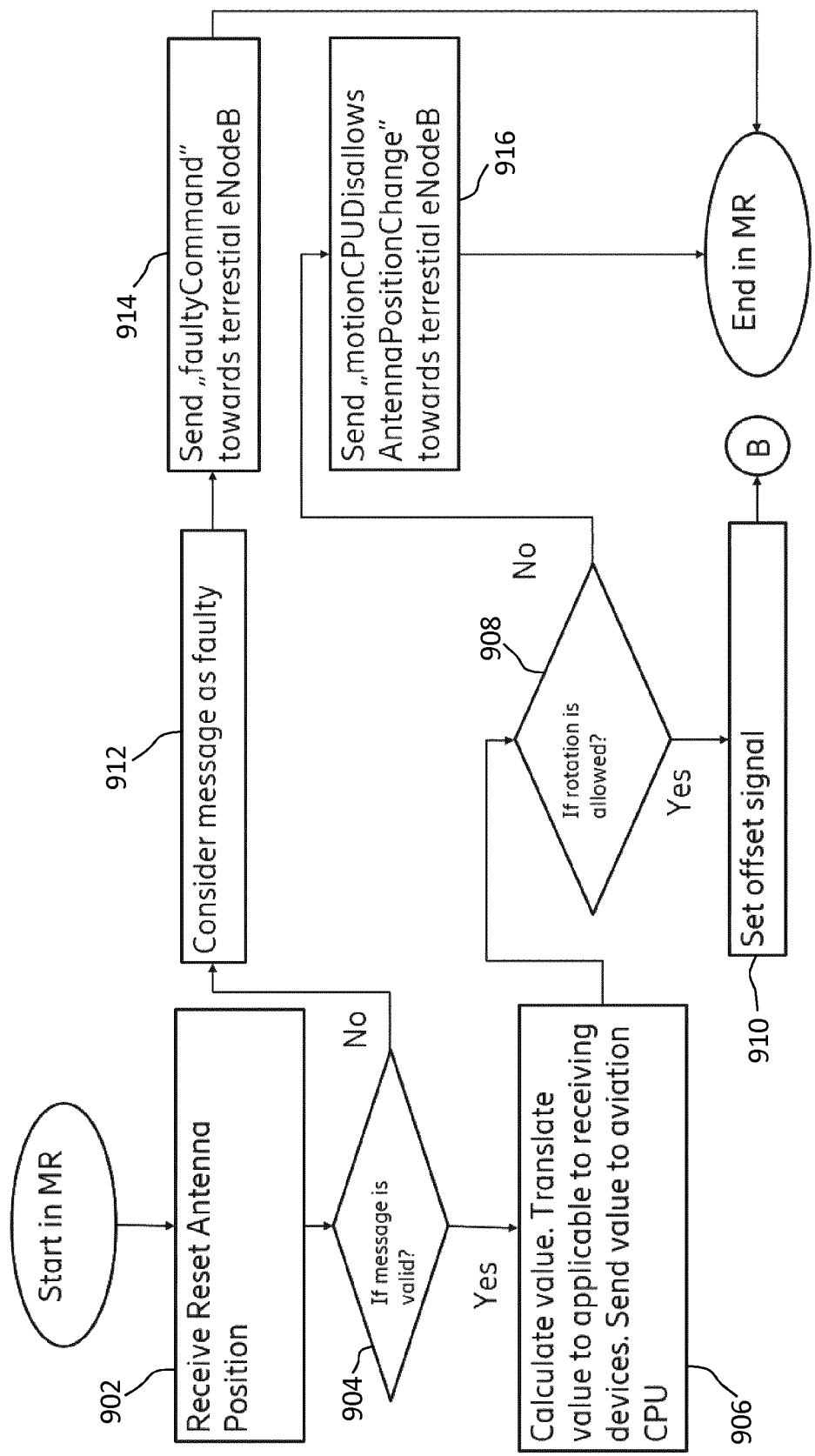
FIGS. 9A to 9C show a flowchart of a minimization method to determine an allowed and/or minimized rotation angle for altering the predefined direction relative to the geographic cardinal directions for the antenna orientation according to instructions, which method may be performed according to the method of FIG. 2.
Figure 9B:
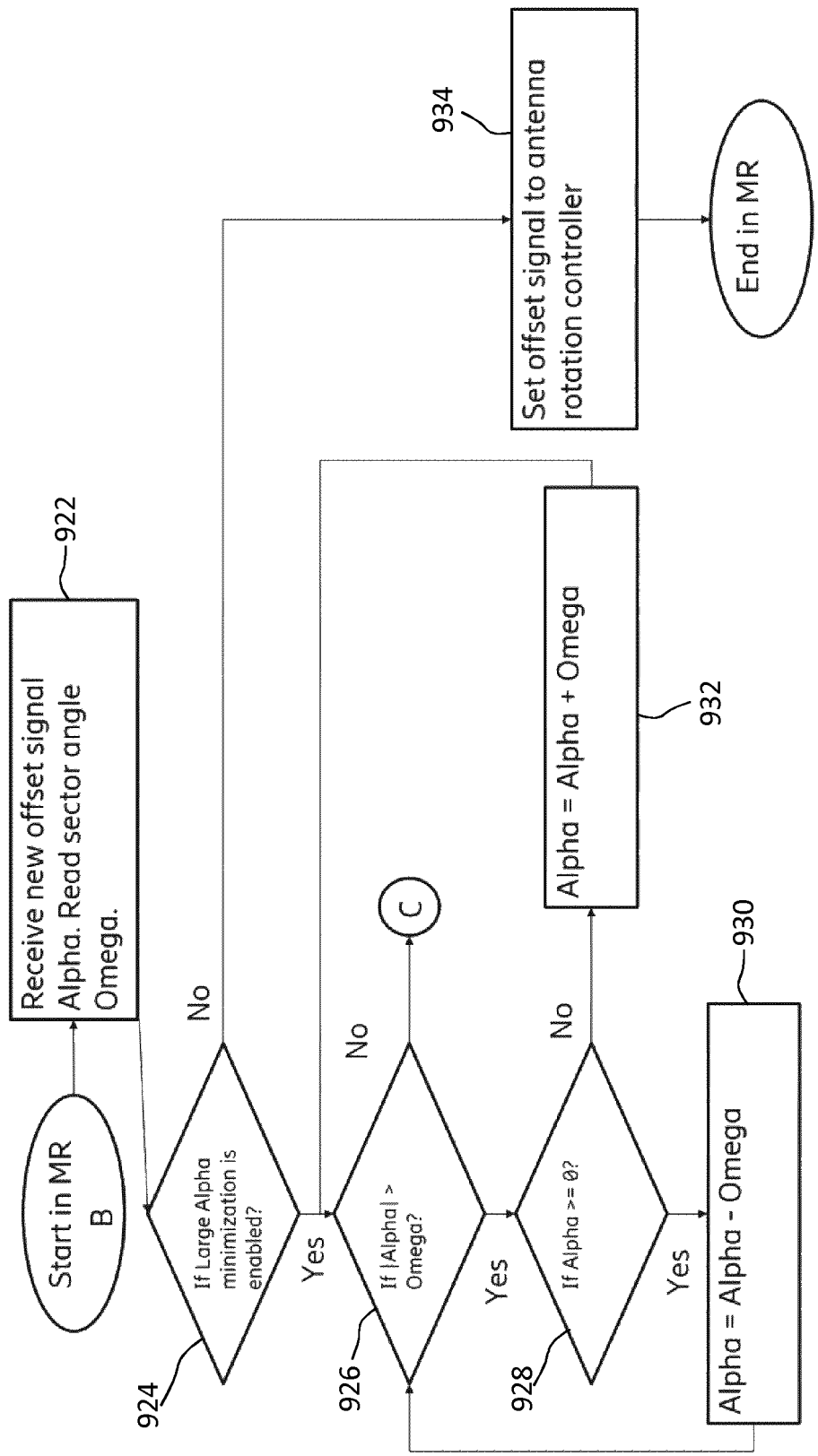
Figure 9C:
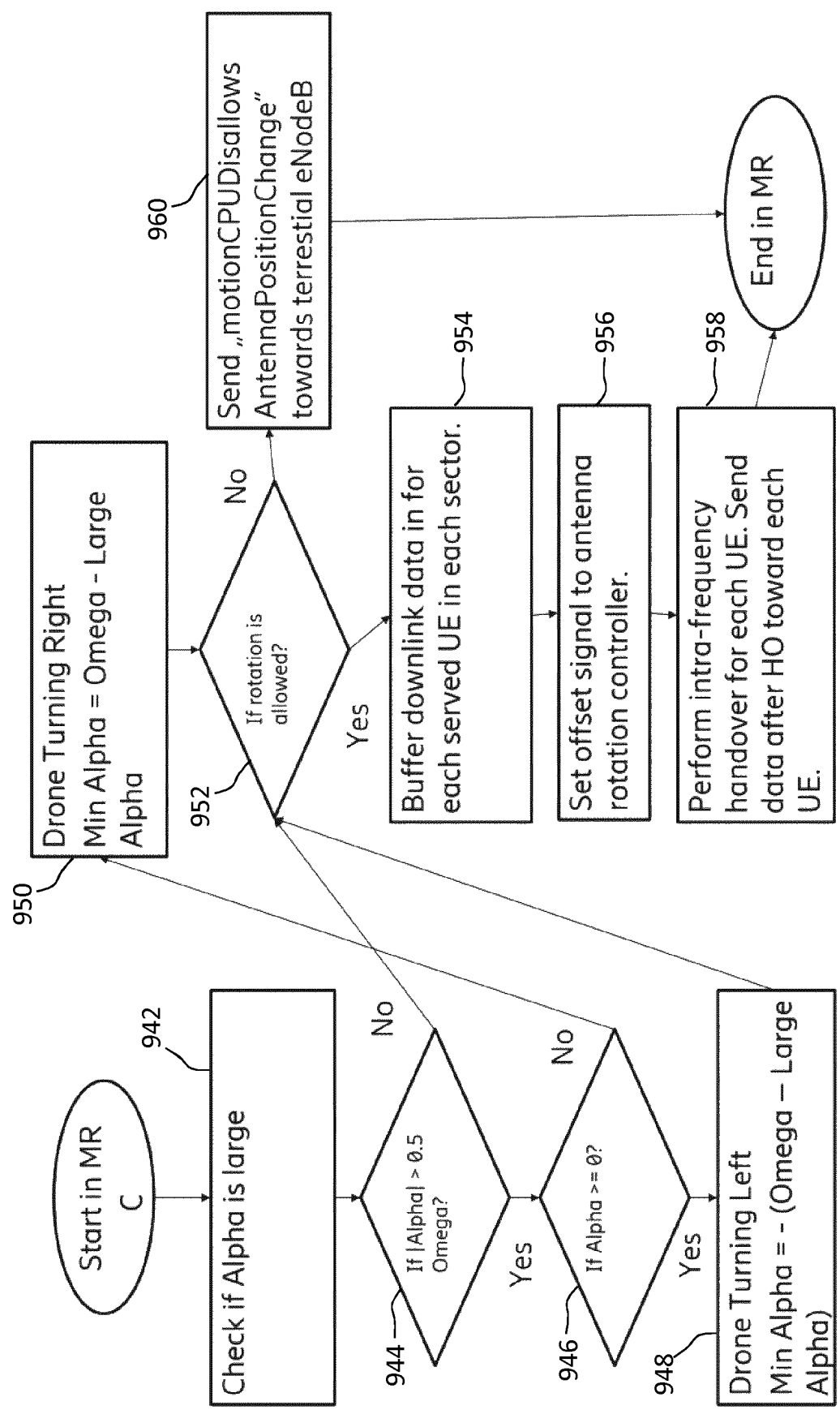

Each of the FIGS. 9A to 9C shows a flowchart of a minimization method to determine an allowed and/or minimized rotation angle for altering the predefined direction relative to the geographic cardinal directions for the antenna orientation according to the instructions. Any two or all three flowcharts may be combinable, e.g., as indicated by the references "B" and "C".

In FIG. 9A, the aircraft such as a mobile robot (MR) embodying or comprising the device 100 receives a signal with a reset command to reset the antenna position in the step 902 (e.g., from the control station). First, the MR checks whether the massage is valid (step 904), which means that the MR checks if it has control over the appropriate plane, in general the horizontal plane, according to the reset command. If the message is considered invalid and thus faulty (step 912), a response signal with the massage "faulty-Command" is transmitted to the control station such as a terrestrial eNodeB (step 914).

If the message is considered valid in the step 904, a value of a rotation angle is calculated and translated into a format applicable to the antenna system (step 906). In the next step 908, it is determined whether the rotation according to the calculated rotation angle is allowed. If the rotation is not allowed, a response signal with the message "motionCPU-DisallowsAntennaPositionChange" is transmitted to the control station (step 916). If the rotation is allowed, an offset signal is set (step 910), e.g. as described in FIG. 6, and the rotational actuator rotates the antenna system in a predefined zero position stored in the memory.

FIG. 9B further describes a method, when a new offset signal a (Alpha) is received (step 922), e.g. a control signal is received from a control station external to the aircraft, the control signal being indicative of instructions for controlling the antenna system. Additionally, the sector angle Ω (Omega) is read from the memory (step 922), wherein Ω (Omega) is in the central angle of a single sector of the multi-sector antenna of the airborne antenna system. Typically, the multi-sector antenna is evenly divided into multiple sectors, i.e. the angle Ω (Omega) has the same value for each of the sectors.

The device 100 may maintain a parameter "Large Alpha minimization". If Large Alpha minimization is not enabled in the step 924, the offset signal is set to the antenna rotation controller (step 934). If Large Alpha minimization is enabled, it is determined whether the absolute value of α (Alpha) is larger than the value of Ω (Omega). If this is the case, it is determined whether a (Alpha) is equal to or larger than 0 (step 928). If α (Alpha) is smaller than 0, a new value of α (Alpha) is set by adding the value of Ω (Omega) to the value of α (Alpha) in the step 932, and then return to the step 926. If α (Alpha) is equal to or larger than 0, and a new value of α (Alpha) is set by subtracting the value of Ω (Omega) from the value of α (Alpha) in the step 930, and then returned to step the 926. When it is determined that the absolute value of α (Alpha) is larger than the value of Ω (Omega), then the method continues according to the flowchart of FIG. 9C (Point C).

The loop of the steps 926, 928 and 930 and the loop of the steps 926, 928 and 932 is repeated, until the absolute value of a (Alpha) is smaller than the value of Ω (Omega), which may be an example of the modulus operation and/or may be implemented according to or achieved by the following exemplary code:

```
Repeat
   If | Alpha | > Omega then
      If Alpha > 0 then
         Alpha = Alpha − Omega
      Else
         Alpha = Alpha + Omega
      Fi
   Fi
Until Alpha < Omega
```

As exemplarily implemented according to FIG. 9C, the device 100 determines (e.g., checks) whether the value of a (Alpha) is large (step 942), in particular, whether the absolute value of α (Alpha) is larger than the value of Ω (Omega) multiplied by 0.5 (step 944). If this criterion of step 944 is fulfilled and the value of α (Alpha) is equal to or larger than 0 (step 946), it is determined that the MR should turn left with the minimized value of α (Alpha or Minimized Alpha) equal to the negative value of the difference of the value of Ω (Omega) and the value of α (Alpha or Large Alpha) according to the step 948, i.e.

Minimized Alpha=−(Omega−Large Alpha).

If the criterion of step 944 is fulfilled and the value of α (Alpha) is smaller than 0 (step 946), it is determined that the MR should turn right with the minimized value of α (Alpha or Minimized Alpha) equal to the value of Ω (Omega) subtracted by the value of α (Alpha or Large Alpha) according to the step 950, i.e.

Minimized Alpha=(Omega−Large Alpha).

Optionally, when the minimized value of α (Alpha or Minimized Alpha) is determined in the steps 948 or 950, it is determined if the rotation is allowed in the step 952. If the rotation is not allowed, a response signal with the message "motionCPUDisallowsAntennaPositionChange" is transmitted to the control station according to the step 960. If the rotation is allowed, downlink data is buffered for each served user equipment (UE) in each sector according to the step 954, the offset signal is set to the antenna rotation controller according to the step 956 and intra-frequency handover (HO) is performed for each of the one or more served UEs, wherein data is transmitted toward each UE after the HO according to the step 958.

The minimization method can be performed by the following exemplary code:

```
Small Alpha when:
  Alpha < absolute ( 0.5 * Omega )
Large Alpha when:
  Alpha > absolute ( 0.5*Omega)
If (Alpha > 0) then
  If Alpha > 0.5 Omega then Alpha is Large Alpha (Drone turning left)
Else
  If (Alpha < 0) then
    If Alpha < 0.5 Omega then Alpha is Large Alpha (Drone turning right)
fi
```

With the described minimization method, the rotation of the antenna can be minimized to angle of ±0.5 of the central angle of a sector of the multi-sector antenna.

Figure 10A:
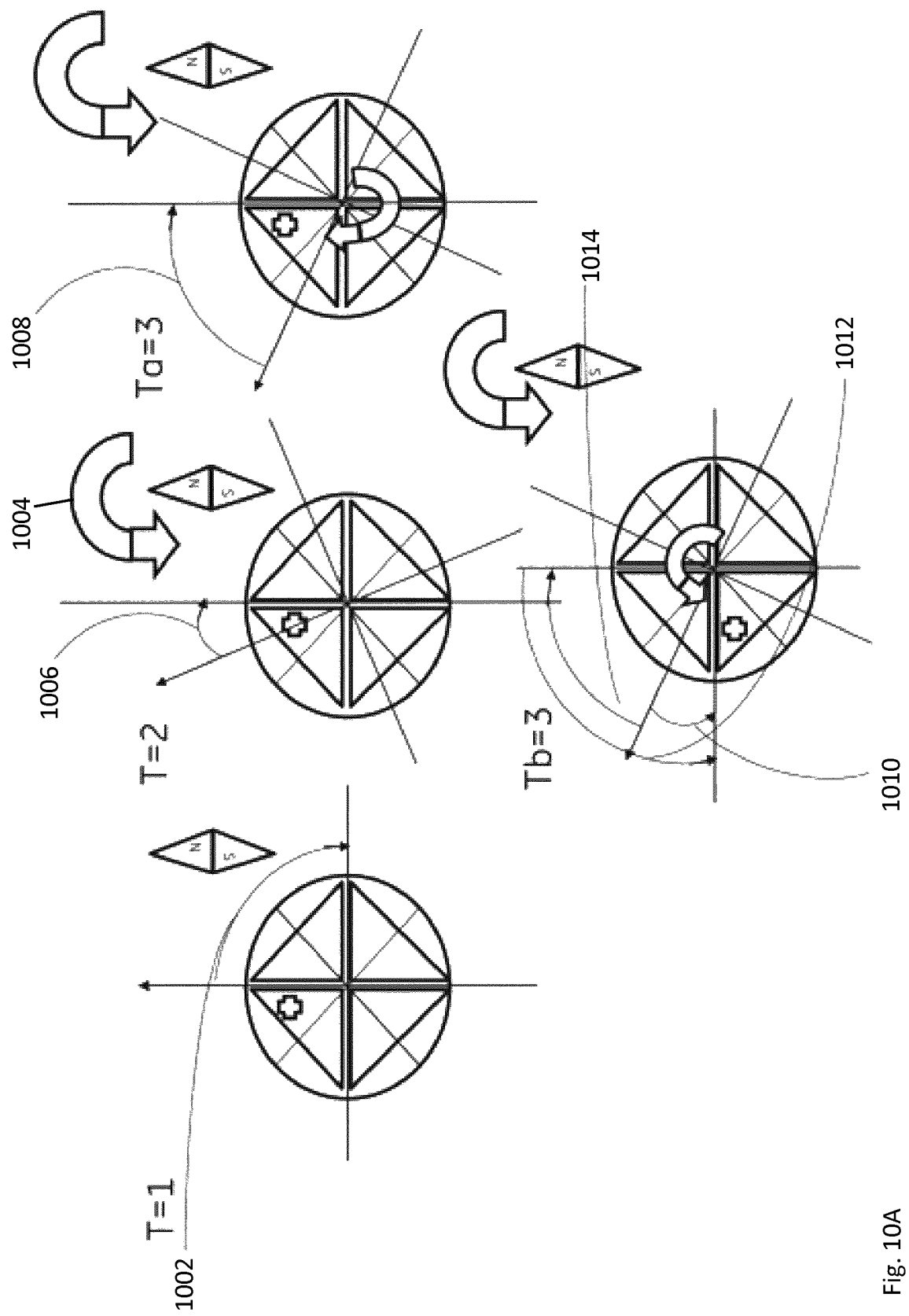
FIGS. 10A to 10B schematically illustrate exemplary implementations of the minimization method of the rotation angle for altering the predefined direction relative to the geographic cardinal directions for the antenna orientation according to the instructions.
Figure 10B:
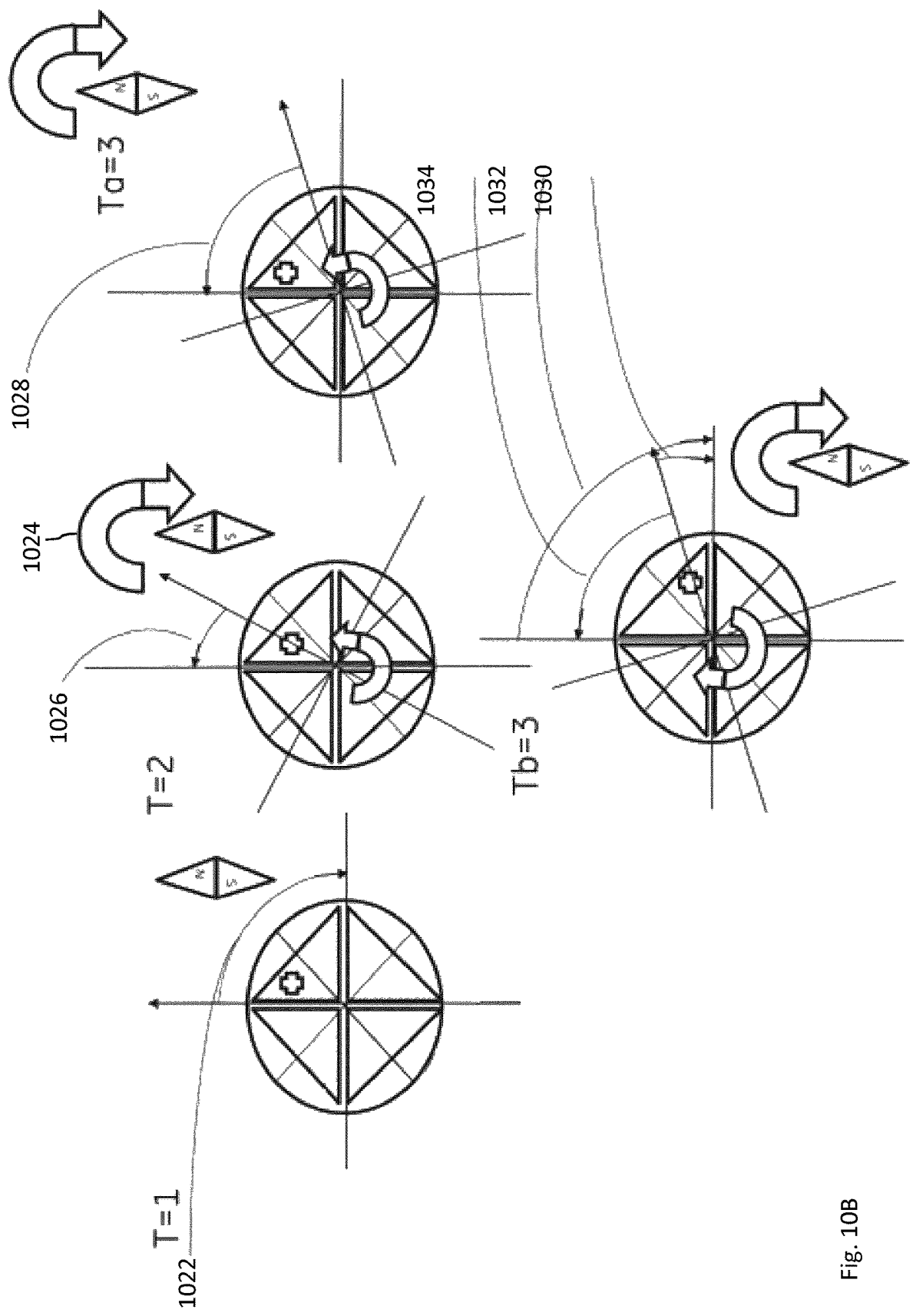

FIGS. 10A to 10B illustrate the minimization method of the rotation angle for altering the predefined direction relative to the geographic cardinal directions for the antenna orientation according to the instructions.

In FIG. 10A, the antenna system is in an initial orientation position at T=1. The antenna system comprises a multi-sector antenna of four sectors with a sector angle Ω (Omega), denoted by the reference 1002, of 90°. At T=2, the arrow 1004 represents a counterclockwise rotation of the aircraft. In order to stabilize the antenna orientation in a predefined direction relative to geographic cardinal directions, the antenna system has to rotate by an angle α (Alpha) 1006 in clockwise direction, the absolute value of α (Alpha) corresponding to the absolute value of the rotation angle of the aircraft. Since the rotation is small, i.e. the value of α (Alpha) is smaller than the value of Ω (Omega) divided by 2, no minimization of Alpha is necessary.

In the case that the rotation of the aircraft is large, i.e. the value of the rotation angle of the aircraft is larger than Ω (Omega) divided by 2, two scenarios are possible. At Ta=3, the minimization method is not enabled and thus the rotation of the aircraft is compensated by rotating the antenna system by an angle α (Alpha) 1008 in clockwise direction. At Tb=3, the main minimization method is enabled. In this case, the rotation of the aircraft is compensated by rotating the antenna system by a minimized angle α (Alpha) 1010, which may be determined by the minimization method, e.g., as depicted in FIGS. 9A to 9C.

Similar to FIG. 10A, FIG. 10B shows the antenna system in an initial orientation position at T=1, wherein the antenna system comprises a multi-sector antenna of four sectors with a sector angle Ω (Omega), denoted by the reference 1022, of 90°. At T=2, the arrow 1024 represents a clockwise rotation of the aircraft. In order to stabilize the antenna orientation in a predefined direction relative to geographic cardinal directions, the antenna system has to rotate by an angle α (Alpha) 1026 in counterclockwise direction, the absolute value of Alpha corresponds to the absolute value of the rotation angle of the aircraft. Since the rotation is small, i.e. the value of α (Alpha) is smaller than the value of Ω (Omega) divided by 2, no minimization of α (Alpha) is necessary.

In the case that the rotation of the aircraft is large, i.e. the value of the rotation angle of the aircraft is larger than Ω (Omega) divided by 2, two scenarios are possible. At Ta=3, the minimization method is not enabled and thus the rotation of the aircraft is compensated by rotating the antenna system by an angle α (Alpha) 1028 in counterclockwise direction. At Tb=3, the main minimization method is enabled. In this case, the rotation of the aircraft is compensated by rotating the antenna system by a minimized angle α (Alpha or Minimized Alpha) 1030, which may be determined by any of the minimization methods described above and/or depicted in FIGS. 9A to 9C.

Figure 11A:
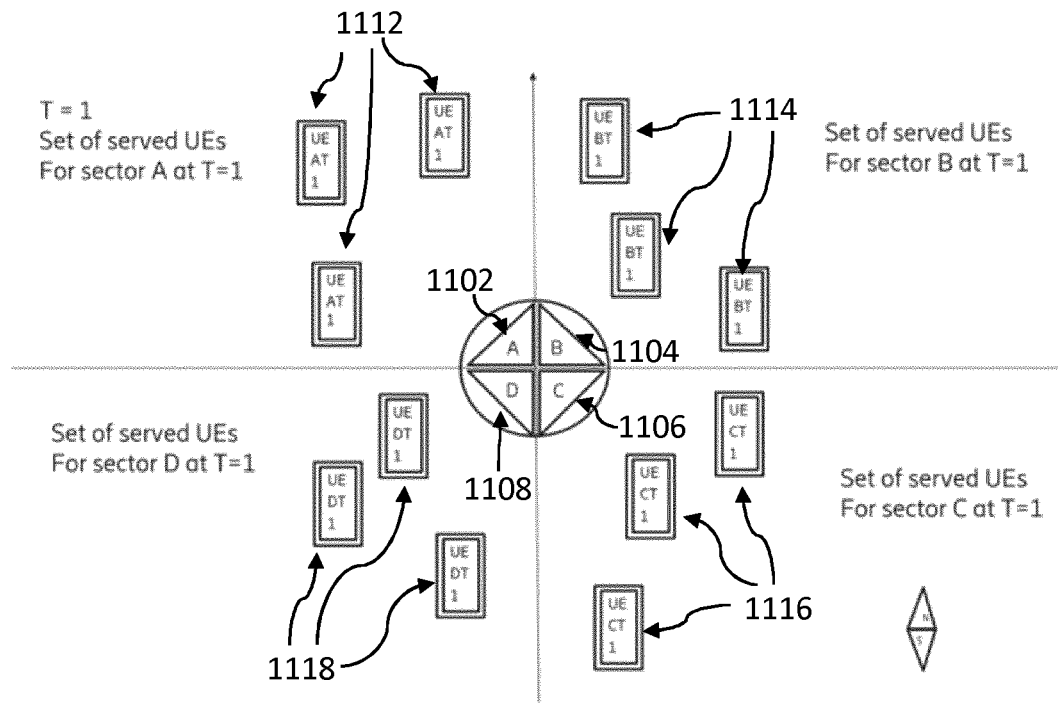
FIGS. 11A to 11C schematically illustrate an intra-aircraft handover process when altering the predefined direction relative to the geographic cardinal directions for the antenna orientation according to the instructions.
Figure 11B:
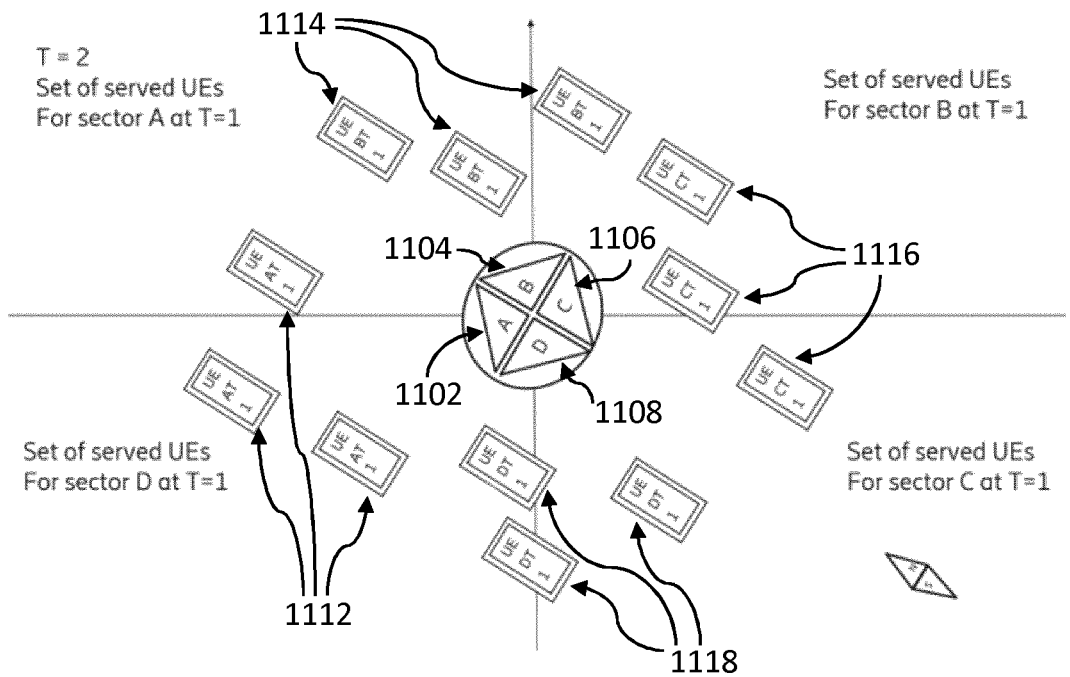
Figure 11C:
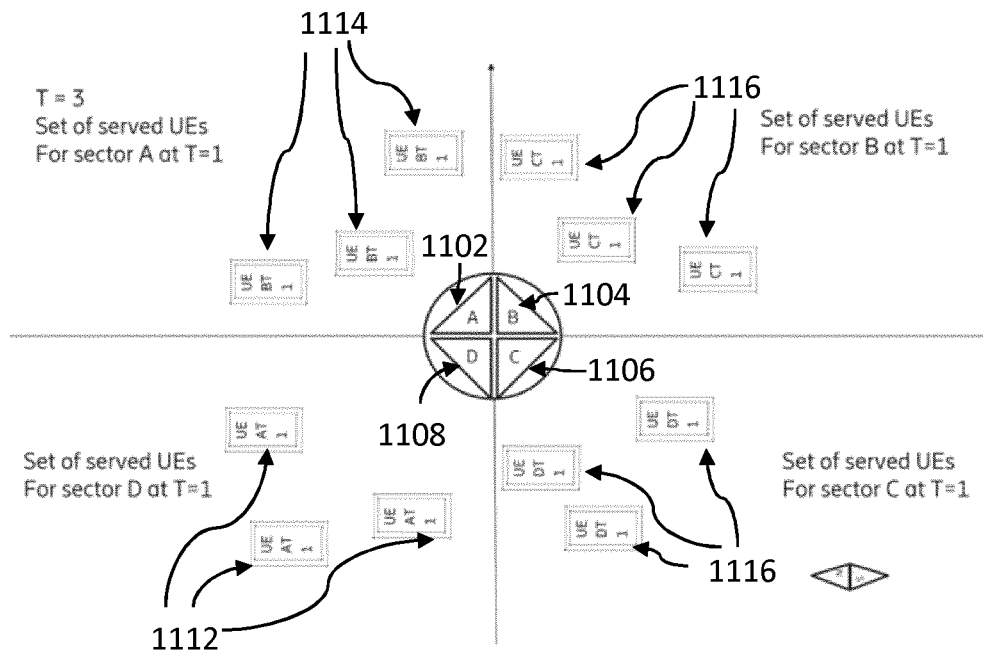

FIGS. 11A to 11C illustrate an exemplary process of an intra-aircraft and/or intra-frequency handover when altering the predefined direction relative to the geographic cardinal directions for the antenna orientation according to the instructions in the step 208 of the method 200. The antenna comprise four (preferably equal and/or symmetric) sectors A, B, C and D denoted by the references 1102, 1104, 1106 and 1108, respectively. Additionally, the north and south geographic cardinal directions are indicated by the compass 1120.

At a time T=1, e.g., as schematically illustrated in FIG. 11A, the UEs 1112 are served by sector 1102 of the antenna system, the UEs 1114 are served by sector 1104 of the antenna system, the UEs 1116 are served by sector 1106 of the antenna system, and the UEs 1118 are served by sector 1108 of the antenna system. FIG. 11B shows no changes in the relative position or orientation of the antenna system and the UEs at a time T=2 using a rotated coordinate system. In FIG. 11C, the antenna system is rotated by 90° in clockwise direction, so that an intra-aircraft handover process has to be performed. As a result, at T=3, the UEs 1112 are served by sector 1108 of the antenna system, the UEs 1114 are served by sector 1102 of the antenna system, the UEs 1116 are served by sector 1104 of the antenna system and the UEs 1118 are served by sector 1106 of the antenna system.

The airborne antenna system may be, or may function as, a station providing radio access, may be part of a radio access network (RAN) and/or may be a node connected to the RAN for controlling the radio access. For example, the airborne antenna system may a 3GPP base station or an access point, for example a Wi-Fi access point.

Figure 12:
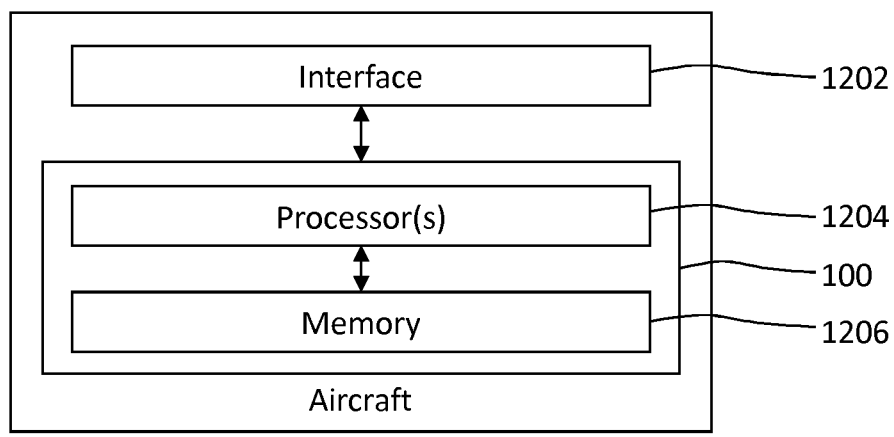
FIG. 12 shows a schematic block diagram of an aircraft embodying the device of FIG. 1.

FIG. 12 shows a schematic block diagram for an embodiment of the device 100. The device 100 comprises an interface 1202, one or more processors 1204 (e.g., the CPU 506 or the controller 508) for performing the method 200 and memory 1206 (e.g., the memory 510) coupled to the processors 1204. For example, the memory 1206 may be encoded with instructions that implement at least one of the modules 102, 104, 106 and 108.

The one or more processors 1204 may be a combination of one or more of a microprocessor, controller, microcontroller, central processing unit, digital signal processor, application specific integrated circuit, field programmable gate array, or any other suitable computing device, resource, or combination of hardware, microcode and/or encoded logic operable to provide, either alone or in conjunction with other components of the device 100, such as the memory 1206, transmitter and/or base station functionality. For example, the one or more processors 1204 may execute instructions stored in the memory 1206. Such functionality may include providing various features and steps discussed herein, including any of the benefits disclosed herein. The expression "the device being operative to perform an action" may denote the device 100 being configured to perform the action.

Figure 13:
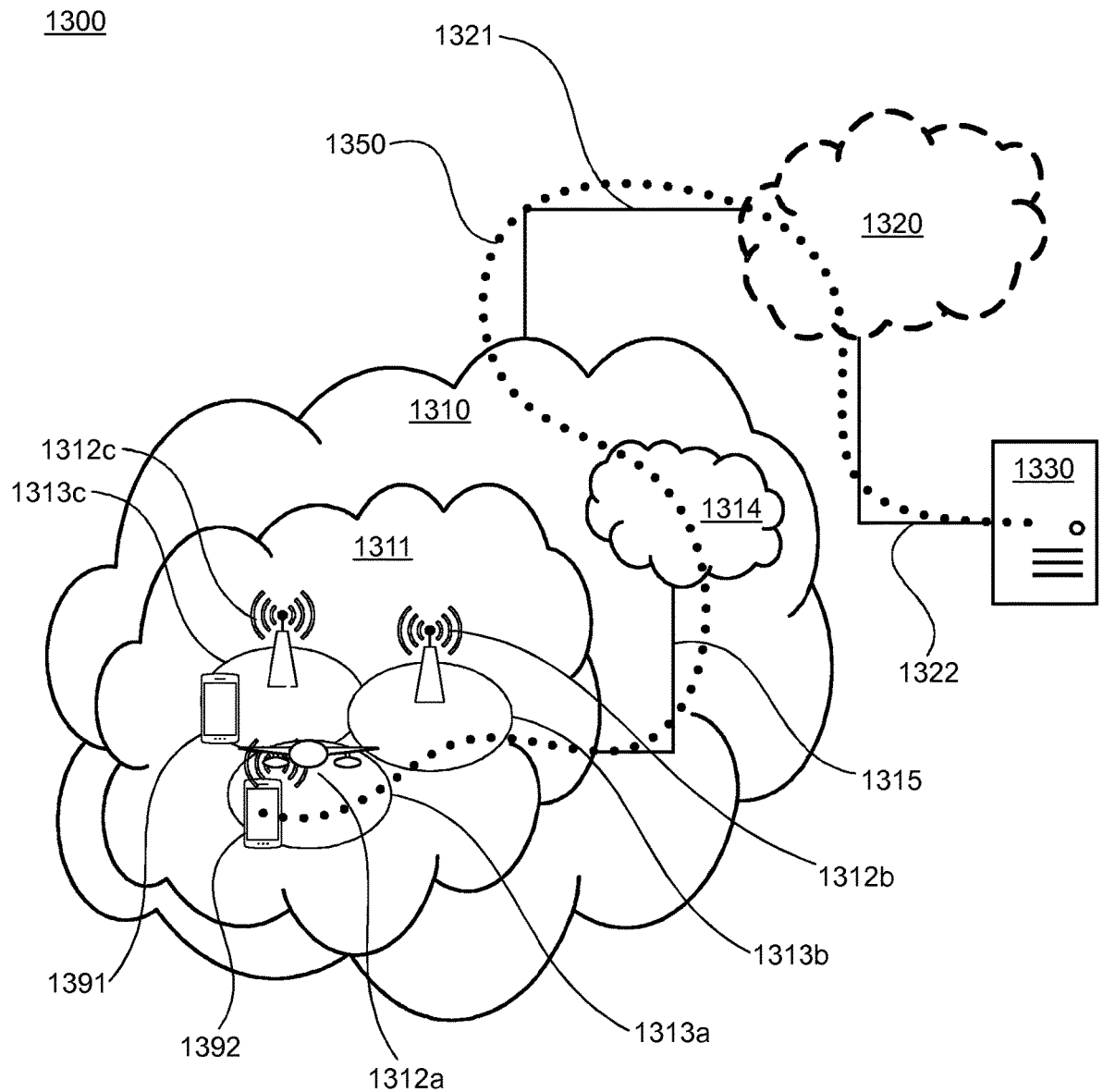
FIG. 13 schematically illustrates an example telecommunication network connected via an intermediate network to a host computer.

With reference to FIG. 13, in accordance with an embodiment, a communication system 1300 includes a telecommunication network 1310, such as a 3GPP-type cellular network, which comprises an access network 1311, such as a radio access network, and a core network 1314. The access network 1311 comprises a plurality of base stations 1312a, 1312b, 1312c, such as NBs, eNBs, gNBs or other types of wireless access points, each defining a corresponding coverage area 1313a, 1313b, 1313c. Each base station 1312a, 1312b, 1312c is connectable to the core network 1314 over a wired or wireless connection 1315. A first user equipment (UE) 1391 located in coverage area 1313c is configured to wirelessly connect to, or be paged by, the corresponding base station 1312c. A second UE 1392 in coverage area 1313a is wirelessly connectable to the corresponding base station 1312a. While a plurality of UEs 1391, 1392 are illustrated in this example, the disclosed embodiments are equally applicable to a situation where a sole UE is in the coverage area or where a sole UE is connecting to the corresponding base station 1312.

Any of the base stations 1312 and the UEs 1391, 1392 may embody the airborne antenna system mounted on an aircraft.

The telecommunication network 1310 is itself connected to a host computer 1330, which may be embodied in the hardware and/or software of a standalone server, a cloud-implemented server, a distributed server or as processing resources in a server farm. The host computer 1330 may be under the ownership or control of a service provider, or may be operated by the service provider or on behalf of the service provider. The connections 1321, 1322 between the telecommunication network 1310 and the host computer 1330 may extend directly from the core network 1314 to the host computer 1330 or may go via an optional intermediate network 1320. The intermediate network 1320 may be one of, or a combination of more than one of, a public, private or hosted network; the intermediate network 1320, if any, may be a backbone network or the Internet; in particular, the intermediate network 1320 may comprise two or more sub-networks (not shown).

The communication system 1300 of FIG. 13 as a whole enables connectivity between one of the connected UEs 1391, 1392 and the host computer 1330. The connectivity may be described as an over-the-top (OTT) connection 1350. The host computer 1330 and the connected UEs 1391, 1392 are configured to communicate data and/or signaling via the OTT connection 1350, using the access network 1311, the core network 1314, any intermediate network 1320 and possible further infrastructure (not shown) as intermediaries. The OTT connection 1350 may be transparent in the sense that the participating communication devices through which the OTT connection 1350 passes are unaware of routing of uplink and downlink communications. For example, a base station 1312 need not be informed about the past routing of an incoming downlink communication with data originating from a host computer 1330 to be forwarded (e.g., handed over) to a connected UE 1391. Similarly, the base station 1312 need not be aware of the future routing of an outgoing uplink communication originating from the UE 1391 towards the host computer 1330.

By virtue of the method 200 being performed by any one of the base stations 1312 (e.g. being embodied by an aircraft), the performance of the OTT connection 1350 can be improved, e.g., in terms of increased throughput, increased coverage and/or reduced latency.

Example implementations, in accordance with an embodiment of the UE, base station and host computer discussed in the preceding paragraphs, will now be described with reference to FIG. 14. In a communication system 1400, a host computer 1410 comprises hardware 1415 including a communication interface 1416 configured to set up and maintain a wired or wireless connection with an interface of a different communication device of the communication system 1400. The host computer 1410 further comprises processing circuitry 1418, which may have storage and/or processing capabilities. In particular, the processing circuitry 1418 may comprise one or more programmable processors, application-specific integrated circuits, field programmable gate arrays or combinations of these (not shown) adapted to execute instructions. The host computer 1410 further comprises software 1411, which is stored in or accessible by the host computer 1410 and executable by the processing circuitry 1418. The software 1411 includes a host application 1412. The host application 1412 may be operable to provide a service to a remote user, such as a UE 1430 connecting via an OTT connection 1450 terminating at the UE 1430 and the host computer 1410. In providing the service to the remote user, the host application 1412 may provide user data, which is transmitted using the OTT connection 1450. The user data may depend on the location of the UE 1430. The user data may comprise auxiliary information or precision advertisements (also: ads) delivered to the UE 1430. The location may be reported by the UE 1430 to the host computer, e.g., using the OTT connection 1450, and/or by the base station 1420, e.g., using a connection 1460.

The communication system 1400 further includes a base station 1420 provided in a telecommunication system and comprising hardware 1425 enabling it to communicate with the host computer 1410 and with the UE 1430. The hardware 1425 may include a communication interface 1426 for setting up and maintaining a wired or wireless connection with an interface of a different communication device of the communication system 1400, as well as a radio interface 1427 for setting up and maintaining at least a wireless connection 1470 with a UE 1430 located in a coverage area (not shown in FIG. 14) served by the base station 1420. The communication interface 1426 may be configured to facilitate a connection 1460 to the host computer 1410. The connection 1460 may be direct, or it may pass through a core network (not shown in FIG. 14) of the telecommunication system and/or through one or more intermediate networks outside the telecommunication system. In the embodiment shown, the hardware 1425 of the base station 1420 further includes processing circuitry 1428, which may comprise one or more programmable processors, application-specific integrated circuits, field programmable gate arrays or combinations of these (not shown) adapted to execute instructions. The base station 1420 further has software 1421 stored internally or accessible via an external connection.

The communication system 1400 further includes the UE 1430 already referred to. Its hardware 1435 may include a radio interface 1437 configured to set up and maintain a wireless connection 1470 with a base station serving a coverage area in which the UE 1430 is currently located. The hardware 1435 of the UE 1430 further includes processing circuitry 1438, which may comprise one or more programmable processors, application-specific integrated circuits, field programmable gate arrays or combinations of these (not shown) adapted to execute instructions. The UE 1430 further comprises software 1431, which is stored in or accessible by the UE 1430 and executable by the processing circuitry 1438. The software 1431 includes a client application 1432. The client application 1432 may be operable to provide a service to a human or non-human user via the UE 1430, with the support of the host computer 1410. In the host computer 1410, an executing host application 1412 may communicate with the executing client application 1432 via the OTT connection 1450 terminating at the UE 1430 and the host computer 1410. In providing the service to the user, the client application 1432 may receive request data from the host application 1412 and provide user data in response to the request data. The OTT connection 1450 may transfer both the request data and the user data. The client application 1432 may interact with the user to generate the user data that it provides.

Figure 14:
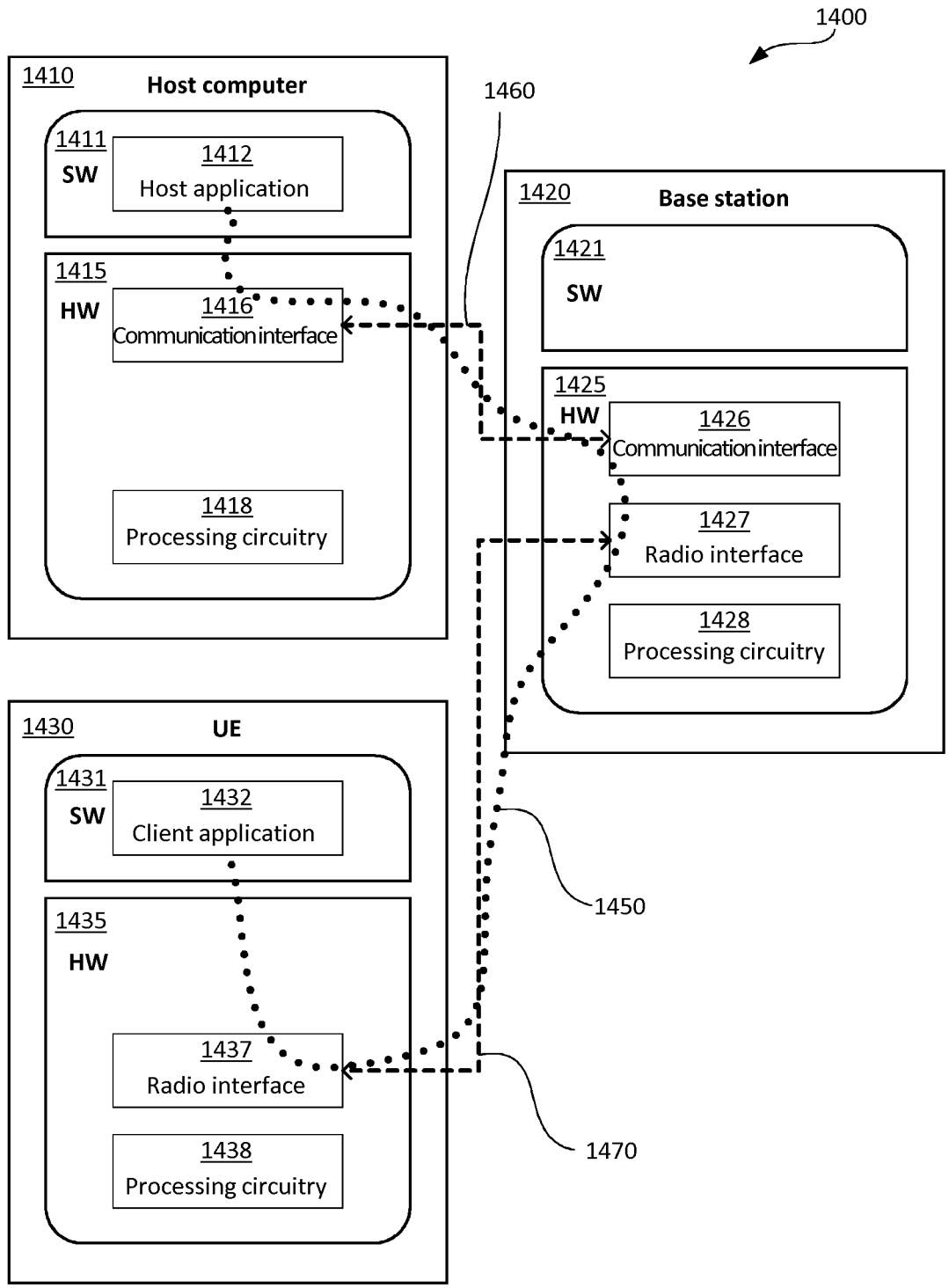
FIG. 14 shows a generalized block diagram of a host computer communicating via a base station or an embodiment of the device of FIG. 1 with a user equipment over a partially wireless connection.

It is noted that the host computer 1410, base station 1420 and UE 1430 illustrated in FIG. 14 may be identical to the host computer 1330, one of the base stations 1312*a*, 1312*b*, 1312*c* and one of the UEs 1391, 1392 of FIG. 13, respectively. This is to say, the inner workings of these entities may be as shown in FIG. 14, and, independently, the surrounding network topology may be that of FIG. 13.

In FIG. 14, the OTT connection 1450 has been drawn abstractly to illustrate the communication between the host computer 1410 and the UE 1430 via the base station 1420, without explicit reference to any intermediary devices and the precise routing of messages via these devices. Network infrastructure may determine the routing, which it may be configured to hide from the UE 1430 or from the service provider operating the host computer 1410, or both. While the OTT connection 1450 is active, the network infrastructure may further take decisions by which it dynamically changes the routing (e.g., on the basis of load balancing consideration or reconfiguration of the network).

The wireless connection 1470 between the UE 1430 and the base station 1420 is in accordance with the teachings of the embodiments described throughout this disclosure. One or more of the various embodiments improve the performance of OTT services provided to the UE 1430 using the OTT connection 1450, in which the wireless connection 1470 forms the last segment. More precisely, the teachings of these embodiments may reduce the latency and improve the data rate and thereby provide benefits such as better responsiveness and improved QoS.

A measurement procedure may be provided for the purpose of monitoring data rate, latency, QoS and other factors on which the one or more embodiments improve. There may further be an optional network functionality for reconfiguring the OTT connection 1450 between the host computer 1410 and UE 1430, in response to variations in the measurement results. The measurement procedure and/or the network functionality for reconfiguring the OTT connection 1450 may be implemented in the software 1411 of the host computer 1410 or in the software 1431 of the UE 1430, or both. In embodiments, sensors (not shown) may be deployed in or in association with communication devices through which the OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of the OTT connection 1450 may include message format, retransmission settings, preferred routing etc.; the reconfiguring need not affect the base station 1420, and it may be unknown or imperceptible to the base station 1420. Such procedures and functionalities may be known and practiced in the art. In certain embodiments, measurements may involve proprietary UE signaling facilitating the host computer's 1410 measurements of throughput, propagation times, latency and the like. The measurements may be implemented in that the software 1411, 1431 causes messages to be transmitted, in particular empty or "dummy" messages, using the OTT connection 1450 while it monitors propagation times, errors etc.

Figure 15:
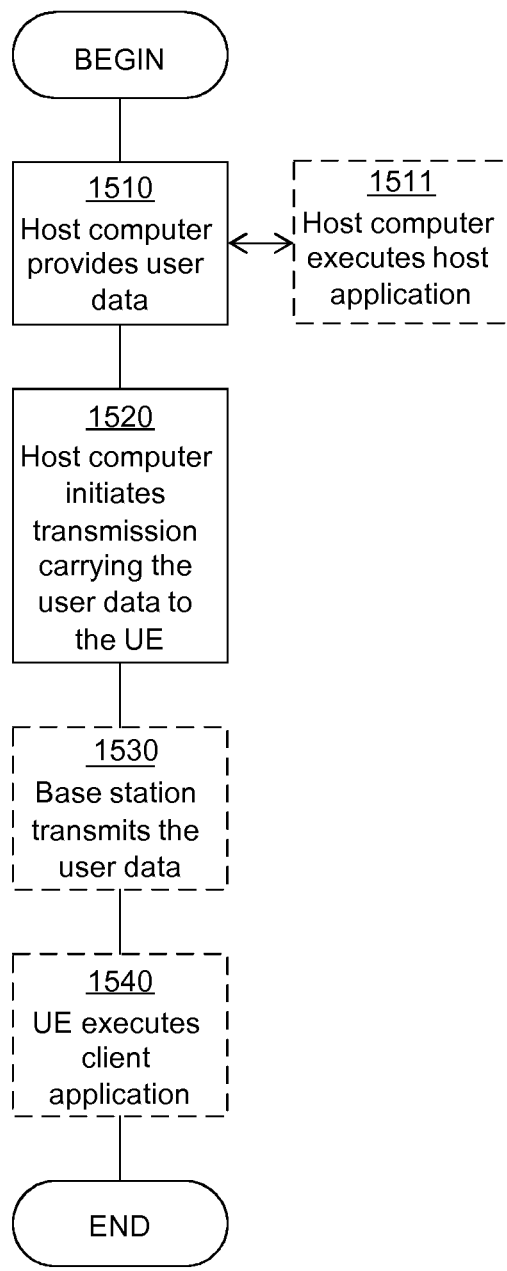
FIGS. 15 and 16 show flowcharts for method embodiments implemented in a communication system including a host computer, a base station or radio device functioning as a gateway and a user equipment.

FIG. 15 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 15 will be included in this paragraph. In a first step 1510 of the method, the host computer provides user data. In an optional substep 1511 of the first step 1510, the host computer provides the user data by executing a host application. In a second step 1520, the host computer initiates a transmission carrying the user data to the UE. In an optional third step 1530, the base station transmits to the UE the user data which was carried in the transmission that the host computer initiated, in accordance with the teachings of the embodiments described throughout this disclosure. In an optional fourth step 1540, the UE executes a client application associated with the host application executed by the host computer.

Figure 16:
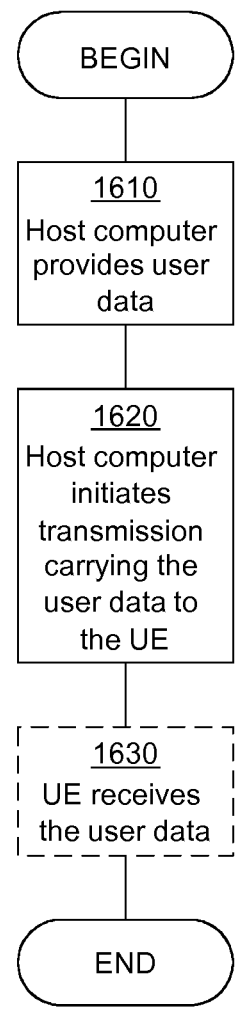

FIG. 16 is a flowchart illustrating a method implemented in a communication system, in accordance with one embodiment. The communication system includes a host computer, a base station and a UE which may be those described with reference to FIGS. 13 and 14. For simplicity of the present disclosure, only drawing references to FIG. 16 will be included in this paragraph. In a first step 1610 of the method, the host computer provides user data. In an optional substep (not shown) the host computer provides the user data by executing a host application. In a second step 1620, the host computer initiates a transmission carrying the user data to the UE. The transmission may pass via the base station, in accordance with the teachings of the embodiments described throughout this disclosure. In an optional third step 1630, the UE receives the user data carried in the transmission.

As has become apparent from above description, embodiments of the technique restore, maintain or expand the coverage area and/or the quality of the network coverage when coverage of the radio telecommunications network is provided by an unmanned or manned aircraft in motion. In particular, the physical antenna orientation of an antenna system mounted on the aircraft is stabilized in a predefined direction relative to the geographic cardinal directions while the aircraft is in motion. For example, the aircraft follows a trajectory over ground and the antenna orientation is stabilized by rotating the antenna system in a counter direction of a curvature of the trajectory.

Many advantages of the present invention will be fully understood from the foregoing description, and it will be apparent that various changes may be made in the form, construction and arrangement of the units and devices without departing from the scope of the invention and/or without sacrificing all of its advantages. Since the invention can be varied in many ways, it will be recognized that the invention should be limited only by the scope of the following claims.

The invention claimed is:

1. A method of controlling an airborne antenna system for a radio telecommunications network mounted on an aircraft, the method comprising:

obtaining information indicating a current direction of the antenna system relative to geographic cardinal directions;
obtaining from a memory information indicating a predefined antenna direction relative to the geographic cardinal directions;
calculating an error using the information indicating the current direction and the information indicating the predefined antenna direction; and
stabilizing a physical antenna orientation of the antenna system in the predefined direction relative to the geographic cardinal directions, wherein
the stabilizing comprises controlling a rotational actuator of the antenna system based on the calculated error.

2. The method of claim 1, further comprising:
receiving a control signal from a control station external to the aircraft, the control signal being indicative of instructions for controlling the antenna system; and
altering the predefined direction relative to the geographic cardinal directions for the antenna orientation according to the instructions.

3. The method of claim 2, wherein
the control signal comprises or is indicative of a radio telecommunications network identifier (ID) of the radio telecommunications network or a cell ID.

4. The method of claim 2, wherein altering the predefined direction relative to the geographic cardinal directions for the antenna orientation according to the instructions comprises:
determining a rotation angle α for altering the predefined direction relative to the geographic cardinal directions for the antenna orientation according to the instructions, optionally wherein the rotation angle α is reduced by a modulus operation according to a sector angle Ω as the modulus of the modulus operation;
rotating the antenna system by the rotation angle α, if the value of the rotation angle α is smaller than or equal to the absolute value of a sector angle Ω divided by 2,
wherein the sector angle Ω corresponds to 360° divided by a number of sectors of the multisector antenna or the order of a rotational symmetry of the antenna system.

5. The method of claim 4, wherein altering the predefined direction relative to the geographic cardinal directions for the antenna orientation according to the instructions further comprises:
rotating the antenna system by the rotation angle β corresponding to the difference of the rotation angle α and the sector angle Ω, if the absolute value of the rotation angle α is greater than the value of the sector angle Ω divided by 2 and the rotation angle α is greater than 0, or
rotating the antenna system by the rotation angle β corresponding to the sum of the rotation angle α and the sector angle Ω, if the absolute value of the rotation angle α is greater than the value of the sector angle Ω and the rotation angle α is smaller than or equal to 0.

6. The method of claim 1, wherein
the geographic cardinal directions are determined using at least one of: avionics of the aircraft, a magnetic compass, or an inertial sensor, or
the step of determining the geographic cardinal directions comprises at least one of:
tracking stationary objects, or
receiving radio signals from at least four navigation satellites and/or ground-based navigation points, wherein the geographic cardinal directions are determined based on the received radio signals.

7. The method of claim 1, wherein the antenna orientation is stabilized in a fixed direction relative to the geographic cardinal directions while the aircraft is moving on a trajectory over ground.

8. The method of claim 1, wherein
the aircraft is a fixed-wing aircraft,
the antenna system is rotatably mounted on a body of the fixed-wing aircraft, and
the antenna orientation of the antenna system is controlled by rotating the antenna system relative to a body of the fixed-wing aircraft.

9. The method of claim 8, wherein
the body comprises a fuselage or one or more wings of the aircraft,
the antenna system is rotatably mounted at a first wing of the aircraft on a first pylon on the bottom side of the first wing, and
a power source of the antenna system is mounted at a second wing of the aircraft on a second pylon on the bottom side of the second wing.

10. The method of claim 9, wherein at least one of the antenna system and the power source is arranged in a casing and/or mounted on the rotational actuator, and/or wherein the power source is rotated in the same or the opposite direction as compared to the rotation of the antenna system.

11. The method of claim 1, wherein
power is provided to the antenna system by a power source,
the antenna system comprises the power source and/or the power source is collocated with the antenna system.

12. The method of claim 1, further comprising:
communicating with another aircraft, which is configured to perform the method, using at least one of:
directional and modulated light of a light amplification by stimulated emission of radiation,
a directional and modulated microwave of a microwave amplification by stimulated emission of radiation,
a backhaul radio link or a radio sidelink, or
an X2 Application Protocol.

13. A device of controlling an airborne antenna system for a radio telecommunications network mounted on an aircraft, comprising at least one processor and a memory, said memory comprising instructions executable by said at least one processor, wherein the device is configured to perform a method comprising:
obtaining information indicating a current direction of the antenna system relative to geographic cardinal directions;
obtaining from a memory information indicating a predefined antenna direction relative to the geographic cardinal directions;
calculating an error using the information indicating the current direction and the information indicating the predefined antenna direction; and
stabilizing a physical antenna orientation of the antenna system in the predefined direction relative to the geographic cardinal directions, wherein
the stabilizing comprises controlling a rotational actuator of the antenna system based on the calculated error.

14. The device of claim 13, wherein the device is further configured to:
alter the predefined direction relative to the geographic cardinal directions for the antenna orientation according to instructions indicated by a control signal transmitted by a control station external to the aircraft, wherein the control station is network node providing an evolved Multimedia Broadcast Multicast Service (eMBMS), and the control signal is broadcasted in a Multimedia Broadcast Service Area of the eMBMS.

15. A communication system including a host computer comprising:

processing circuitry configured to provide user data; and a communication interface configured to forward user data to a cellular network comprising a device for transmission of the user data to a user equipment (UE), the device comprising a radio interface coupled to an antenna system and processing circuitry being configured to execute the method of claim 1.

16. The communication system of claim 15, further including the UE.

17. The communication system of claim 15, wherein the cellular network further includes the device configured to communicate with the UE.

18. The communication system of claim 15, wherein:

the processing circuitry of the host computer is configured to execute a host application, thereby providing the user data; and the processing circuitry of the UE is configured to execute a client application associated with the host application.

* * * * *